United States Patent
Patil

(10) Patent No.: US 12,544,336 B2
(45) Date of Patent: Feb. 10, 2026

(54) PALATABLE FORMULATIONS

(71) Applicant: Elanco US Inc., Greenfield, IN (US)

(72) Inventor: Rajesh Patil, Greenfield, IN (US)

(73) Assignee: Elanco US Inc.

( * ) Notice: Subject to any disclaimer, the term of this patent is extended or adjusted under 35 U.S.C. 154(b) by 244 days.

(21) Appl. No.: 18/043,743

(22) PCT Filed: Sep. 2, 2021

(86) PCT No.: PCT/US2021/048842
§ 371 (c)(1),
(2) Date: Mar. 2, 2023

(87) PCT Pub. No.: WO2022/051478
PCT Pub. Date: Mar. 10, 2022

(65) Prior Publication Data
US 2023/0372249 A1    Nov. 23, 2023

Related U.S. Application Data

(60) Provisional application No. 63/075,055, filed on Sep. 4, 2020.

(51) Int. Cl.
| | |
|---|---|
| A61K 9/20 | (2006.01) |
| A61K 9/00 | (2006.01) |
| A61K 31/365 | (2006.01) |
| A61K 31/422 | (2006.01) |
| A61K 31/4985 | (2006.01) |

(52) U.S. Cl.
CPC ......... *A61K 9/2081* (2013.01); *A61K 9/0056* (2013.01); *A61K 31/365* (2013.01); *A61K 31/422* (2013.01); *A61K 31/4985* (2013.01)

(58) Field of Classification Search
CPC .. A61K 9/2081; A61K 9/0056; A61K 31/365; A61K 31/422; A61K 31/4985
See application file for complete search history.

(56) References Cited

U.S. PATENT DOCUMENTS

| | | |
|---|---|---|
| 3,594,470 A | 7/1971 | Borodkin et al. |
| 4,001,411 A | 1/1977 | Seubert et al. |
| 4,051,243 A | 9/1977 | Seubert et al. |
| 4,684,524 A | 8/1987 | Eckenhoff et al. |

(Continued)

FOREIGN PATENT DOCUMENTS

| | | |
|---|---|---|
| CA | 2883139 C | 8/2021 |
| CN | 103083344 A | 5/2013 |

(Continued)

OTHER PUBLICATIONS

International Search Report dated Mar. 10, 2022, issued in International Patent Application No. PCT/US2021/048842 (4 pages).

(Continued)

*Primary Examiner* — Jianfeng Song
(74) *Attorney, Agent, or Firm* — McBee Moore & Vanik IP, LLC

(57) ABSTRACT

Palatable oral dosage formulations are provided including an effective amount of an isoxazoline parasiticidal agent, an avermectin, and a pyrazinoisoquinoline, and optionally one or more additional active ingredients, such as a tetrahydropyrimidine.

17 Claims, 1 Drawing Sheet

(56) References Cited

U.S. PATENT DOCUMENTS

| | | |
|---|---|---|
| 4,704,118 A | 11/1987 | Eckenhoff |
| 4,708,867 A | 11/1987 | Hsiao |
| 4,831,017 A | 5/1989 | Egerton |
| 4,853,372 A | 8/1989 | Williams et al. |
| 4,867,980 A | 9/1989 | Edwards et al. |
| 5,036,069 A | 7/1991 | Andrews et al. |
| 5,070,015 A | 12/1991 | Petuch et al. |
| 5,211,951 A | 5/1993 | Sparer et al. |
| 5,219,563 A | 6/1993 | Douglas et al. |
| 5,290,804 A | 3/1994 | Goegelman et al. |
| 5,411,737 A | 5/1995 | Hsu et al. |
| 5,824,653 A | 10/1998 | Beuvry et al. |
| 5,837,228 A | 11/1998 | Shih et al. |
| 5,925,374 A | 7/1999 | McLaren et al. |
| 6,159,932 A | 12/2000 | Mencke et al. |
| 6,165,987 A | 12/2000 | Harvey |
| 6,190,591 B1 | 2/2001 | Lengerich |
| 6,207,179 B1 | 3/2001 | Mihalik |
| 6,340,672 B1 | 1/2002 | Mihalik |
| 6,383,471 B1 | 5/2002 | Chen et al. |
| 6,399,786 B1 | 6/2002 | Colletti et al. |
| 6,489,303 B2 | 12/2002 | Jancys |
| 6,492,340 B2 | 12/2002 | Mihalik |
| 6,503,881 B2 | 1/2003 | Krieger et al. |
| 6,552,002 B2 | 4/2003 | Steber et al. |
| 6,596,714 B1 | 7/2003 | Mihalik |
| 6,787,342 B2 | 9/2004 | Chen |
| 6,797,701 B2 | 9/2004 | Lukas et al. |
| 6,858,601 B2 | 2/2005 | Mihalik |
| 6,893,652 B2 | 5/2005 | Sabnis et al. |
| 6,974,788 B2 | 12/2005 | Harris et al. |
| 6,991,801 B2 | 1/2006 | Soll et al. |
| 7,001,889 B2 | 2/2006 | Freehauf et al. |
| 7,041,863 B2 | 5/2006 | Harris et al. |
| 7,144,878 B2 | 12/2006 | Mihalik |
| 7,201,923 B1 | 4/2007 | Lengerich |
| 7,309,759 B2 | 12/2007 | Krieger et al. |
| 7,348,027 B2 | 3/2008 | Rose et al. |
| 7,396,819 B2 | 7/2008 | Burke et al. |
| 7,396,820 B2 | 7/2008 | Cottrell et al. |
| 7,514,464 B2 | 4/2009 | Billen et al. |
| 7,563,773 B2 | 7/2009 | Freehauf et al. |
| 7,563,937 B2 | 7/2009 | Harris et al. |
| 7,608,604 B2 | 10/2009 | Comlay et al. |
| 7,622,500 B2 | 11/2009 | Gibson et al. |
| 7,674,475 B2 | 3/2010 | Sabnis et al. |
| 7,687,471 B2 | 3/2010 | Hayes et al. |
| 7,767,228 B2 | 8/2010 | Mattern et al. |
| 7,902,232 B2 | 3/2011 | Billen et al. |
| 7,955,632 B2 | 6/2011 | Paulsen et al. |
| 7,960,426 B2 | 6/2011 | Billen et al. |
| 8,044,230 B2 | 10/2011 | Glinka |
| 8,084,486 B2 | 12/2011 | Billen et al. |
| 8,084,643 B2 | 12/2011 | Glinka et al. |
| 8,097,614 B2 | 1/2012 | Heit et al. |
| 8,114,455 B2 | 2/2012 | Paulsen et al. |
| 8,241,669 B2 | 8/2012 | Sabnis et al. |
| 8,313,752 B2 | 11/2012 | Razzak et al. |
| 8,362,086 B2 | 1/2013 | Soll et al. |
| 8,404,649 B2 | 3/2013 | Curtis et al. |
| 8,410,153 B2 | 4/2013 | Lahm et al. |
| 8,415,310 B2 | 4/2013 | Vaillancourt et al. |
| 8,461,176 B2 | 6/2013 | Soll et al. |
| 8,466,115 B2 | 6/2013 | Curtis et al. |
| 8,501,241 B1 | 8/2013 | Ghawi et al. |
| 8,512,787 B2 | 8/2013 | Paulsen et al. |
| 8,541,019 B2 | 9/2013 | Isele |
| 8,551,962 B2 | 10/2013 | Costa et al. |
| 8,618,126 B2 | 12/2013 | Fallois et al. |
| 8,623,322 B2 | 1/2014 | Norenberg |
| 8,628,794 B2 | 1/2014 | Isele |
| 8,642,636 B2 | 2/2014 | Meng |
| 8,642,799 B2 | 2/2014 | Isabel et al. |
| 8,653,128 B1 | 2/2014 | Taneja |
| 8,685,462 B1 | 4/2014 | Merzouk et al. |
| 8,709,440 B2 | 4/2014 | Meijs et al. |
| 8,715,711 B2 | 5/2014 | Cady et al. |
| 8,735,362 B2 | 5/2014 | Cassayre et al. |
| 8,754,053 B2 | 6/2014 | Pitterna et al. |
| 8,784,896 B2 | 7/2014 | Ghawi et al. |
| 8,790,711 B2 | 7/2014 | Ghawi et al. |
| 8,852,648 B2 | 10/2014 | Salamone et al. |
| 8,865,240 B2 | 10/2014 | Paulsen et al. |
| 8,895,587 B2 | 11/2014 | Cassayre et al. |
| 8,932,642 B2 | 1/2015 | Ghawi et al. |
| 8,940,271 B2 | 1/2015 | Heit et al. |
| 8,957,058 B2 | 2/2015 | Cassayre et al. |
| 8,962,034 B2 | 2/2015 | Ghawi et al. |
| 8,962,681 B2 | 2/2015 | Conder et al. |
| 8,980,893 B2 | 3/2015 | Fallois et al. |
| 8,980,896 B2 | 3/2015 | Holmes et al. |
| 9,005,667 B1 | 4/2015 | Ghawi et al. |
| 9,016,221 B2 | 4/2015 | Brennan et al. |
| 9,017,732 B1 | 4/2015 | Ghawi et al. |
| 9,034,912 B1 | 5/2015 | Taneja |
| 9,044,453 B2 | 6/2015 | Cady et al. |
| 9,061,013 B2 | 6/2015 | Vaillancourt et al. |
| 9,066,945 B2 | 6/2015 | Turberg et al. |
| 9,073,912 B2 | 7/2015 | Sheehan et al. |
| 9,078,444 B2 | 7/2015 | Cassayre et al. |
| 9,133,172 B2 | 9/2015 | Chubb et al. |
| 9,144,587 B2 | 9/2015 | Ghawi et al. |
| 9,149,498 B2 | 10/2015 | Abdualkader et al. |
| 9,173,403 B2 | 11/2015 | Rosentel, Jr. et al. |
| 9,173,870 B2 | 11/2015 | Fuchs et al. |
| 9,180,121 B2 | 11/2015 | Soll et al. |
| 9,204,648 B2 | 12/2015 | Cassayre et al. |
| 9,226,928 B2 | 1/2016 | Chubb et al. |
| 9,233,100 B2 | 1/2016 | Soll et al. |
| 9,237,751 B2 | 1/2016 | Reynolds |
| 9,254,268 B2 | 2/2016 | Krayz et al. |
| 9,259,417 B2 | 2/2016 | Soll et al. |
| 9,265,802 B2 | 2/2016 | Ghawi et al. |
| 9,265,803 B2 | 2/2016 | Ghawi et al. |
| 9,283,176 B2 | 3/2016 | Albright et al. |
| 9,301,525 B2 | 4/2016 | Horikoshi et al. |
| 9,307,766 B2 | 4/2016 | Cassayre et al. |
| 9,314,478 B2 | 4/2016 | Cleverly et al. |
| 9,339,505 B2 | 5/2016 | Cassayre et al. |
| 9,345,686 B2 | 5/2016 | Graaff et al. |
| 9,352,059 B2 | 5/2016 | Norenberg |
| 9,364,433 B2 | 6/2016 | Andersson et al. |
| 9,376,434 B2 | 6/2016 | Fallois et al. |
| 9,381,155 B2 | 7/2016 | Paulsen et al. |
| 9,393,221 B2 | 7/2016 | Wu |
| 9,433,648 B2 | 9/2016 | Ghawi et al. |
| 9,433,649 B2 | 9/2016 | Ghawi et al. |
| 9,457,088 B2 | 10/2016 | Soll et al. |
| 9,480,720 B1 | 11/2016 | Ghawi et al. |
| 9,532,978 B2 | 1/2017 | Fuchs et al. |
| 9,533,961 B2 | 1/2017 | Fischer et al. |
| 9,545,106 B2 | 1/2017 | Cassayre et al. |
| 9,549,965 B2 | 1/2017 | Hu et al. |
| 9,550,739 B2 | 1/2017 | Fischer et al. |
| 9,593,126 B2 | 3/2017 | Greenwood et al. |
| 9,597,285 B2 | 3/2017 | Cleverly et al. |
| 9,597,361 B2 | 3/2017 | Ghawi et al. |
| 9,598,389 B2 | 3/2017 | Lu et al. |
| 9,609,869 B2 | 4/2017 | Cassayre et al. |
| 9,622,982 B2 | 4/2017 | Bannister et al. |
| 9,629,888 B2 | 4/2017 | Lo et al. |
| 9,649,279 B2 | 5/2017 | Jaklenec et al. |
| 9,655,884 B2 | 5/2017 | Williams et al. |
| 9,675,073 B2 | 6/2017 | Rawal et al. |
| 9,675,736 B2 | 6/2017 | Burgess et al. |
| 9,682,949 B2 | 6/2017 | Cassayre et al. |
| 9,686,988 B2 | 6/2017 | Rawal et al. |
| 9,714,228 B2 | 7/2017 | Qacemi et al. |
| 9,724,345 B2 | 8/2017 | Andersson et al. |
| 9,744,127 B2 * | 8/2017 | Kanikanti ............ A61K 9/2022 |
| 9,770,440 B2 | 9/2017 | Freehauf et al. |
| 9,770,449 B2 | 9/2017 | Rosentel, Jr. et al. |
| 9,776,994 B2 | 10/2017 | Lu et al. |
| 9,776,999 B2 | 10/2017 | Fallois et al. |

(56) References Cited

U.S. PATENT DOCUMENTS

| | | |
|---|---|---|
| 9,821,028 B2 | 11/2017 | Cook et al. |
| 9,877,950 B2 | 1/2018 | Soll et al. |
| 9,913,471 B2 | 3/2018 | Cassayre et al. |
| 9,931,320 B2 | 4/2018 | Soll et al. |
| 9,932,337 B2 | 4/2018 | Maillard et al. |
| 9,949,953 B2 | 4/2018 | Soll et al. |
| 10,028,949 B2 | 7/2018 | Andersson et al. |
| 10,064,897 B2 | 9/2018 | Ghawi et al. |
| 10,143,701 B2 | 12/2018 | Derrieu et al. |
| 10,155,730 B2 | 12/2018 | Pitterna et al. |
| 10,160,758 B2 | 12/2018 | Waechtler et al. |
| 10,188,668 B2 | 1/2019 | Bannister et al. |
| 10,206,400 B2 | 2/2019 | Cassayre et al. |
| 10,212,936 B2 | 2/2019 | Renga et al. |
| 10,226,455 B2 | 3/2019 | Sacchettini et al. |
| 10,265,373 B2 | 4/2019 | Hu et al. |
| 10,266,524 B2 | 4/2019 | Cassayre et al. |
| 10,272,071 B2 | 4/2019 | Heckeroth et al. |
| 10,273,213 B2 | 4/2019 | Eberhardt et al. |
| 10,287,281 B2 | 5/2019 | Lu et al. |
| 10,300,173 B2 | 5/2019 | Burgess et al. |
| 10,307,405 B2 | 6/2019 | Rose et al. |
| 10,321,683 B2 | 6/2019 | Kagami |
| 10,349,655 B2 | 7/2019 | Horikoshi et al. |
| 10,350,196 B2 | 7/2019 | Foster et al. |
| 10,383,854 B2 | 8/2019 | Soll et al. |
| 10,433,552 B2 | 10/2019 | Yang et al. |
| 10,456,358 B2 | 10/2019 | Lehay et al. |
| 10,517,294 B2 | 12/2019 | Qacemi et al. |
| 10,543,170 B2 | 1/2020 | Kanikanti et al. |
| 10,548,890 B2 | 2/2020 | Andersson et al. |
| 10,561,641 B2 | 2/2020 | Cady et al. |
| 10,570,129 B2 | 2/2020 | Subramanian et al. |
| 10,596,156 B2 | 3/2020 | Soll et al. |
| 10,646,473 B2 | 5/2020 | Soll et al. |
| 10,653,675 B2 | 5/2020 | Heckeroth et al. |
| 10,662,163 B2 | 5/2020 | Vries et al. |
| 10,695,331 B2 | 6/2020 | Corrales et al. |
| 10,710,991 B2 | 7/2020 | Cassayre et al. |
| 10,722,448 B2 | 7/2020 | Hansen |
| 10,736,319 B2 | 8/2020 | Horikoshi et al. |
| 10,750,744 B2 | 8/2020 | Yang |
| 10,750,745 B2 | 8/2020 | Cassayre et al. |
| 10,751,440 B2 | 8/2020 | McDermott et al. |
| 10,766,970 B2 | 9/2020 | Welker et al. |
| 10,786,487 B2 | 9/2020 | Soll et al. |
| 10,799,483 B2 | 10/2020 | Williams et al. |
| 10,844,154 B2 | 11/2020 | Hood |
| 10,864,195 B2 | 12/2020 | Fuchs et al. |
| 10,869,477 B2 | 12/2020 | Cassayre et al. |
| 10,894,783 B2 | 1/2021 | Zhang et al. |
| 10,940,163 B2 | 3/2021 | Brown et al. |
| 10,973,759 B2 | 4/2021 | Kluger et al. |
| 10,993,988 B2 | 5/2021 | Bondesen et al. |
| 11,026,956 B2 | 6/2021 | Bannister et al. |
| 11,045,466 B2 | 6/2021 | Andersson et al. |
| 11,103,524 B2 | 8/2021 | Derrieu et al. |
| 11,110,195 B2 | 9/2021 | McDermott et al. |
| 11,130,739 B2 | 9/2021 | Vries et al. |
| 11,147,764 B2 | 10/2021 | Kanikanti et al. |
| 11,179,372 B2 | 11/2021 | Flochlay-Sigognault et al. |
| 11,253,593 B2 | 2/2022 | Cleverly et al. |
| 11,285,101 B2 | 3/2022 | Alteheld et al. |
| 11,324,220 B2 | 5/2022 | Yang |
| 11,337,917 B2 | 5/2022 | Roepke et al. |
| 11,357,231 B2 | 6/2022 | Cassayre et al. |
| 11,382,865 B2 | 7/2022 | Kanikanti et al. |
| 11,478,421 B2 | 10/2022 | McDonnell et al. |
| 11,484,528 B2 | 11/2022 | Cady et al. |
| 11,497,732 B2 | 11/2022 | Fallois et al. |
| 11,505,548 B2 | 11/2022 | Hawryluk et al. |
| 11,530,187 B2 | 12/2022 | Schmitt |
| 11,541,017 B2 | 1/2023 | Jaklenec et al. |
| 11,548,859 B2 | 1/2023 | Schmitt |
| 11,549,868 B2 | 1/2023 | Zohdy et al. |
| 11,559,491 B2 | 1/2023 | Garcia et al. |
| 11,578,083 B2 | 2/2023 | Dickhaut et al. |
| 11,583,545 B2 | 2/2023 | Pate |
| 11,628,452 B2 | 4/2023 | Shartle et al. |
| 11,648,238 B2 | 5/2023 | Freehauf et al. |
| 11,654,431 B2 | 5/2023 | Shartle et al. |
| 11,679,080 B2 | 6/2023 | McDonnell et al. |
| 11,723,864 B2 | 8/2023 | Cannon et al. |
| 2002/0004486 A1 | 1/2002 | Steber et al. |
| 2002/0010142 A1 | 1/2002 | Mihalik |
| 2002/0028780 A1 | 3/2002 | Lukas et al. |
| 2002/0035061 A1 | 3/2002 | Krieger et al. |
| 2002/0045598 A1 | 4/2002 | Colletti et al. |
| 2002/0045653 A1 | 4/2002 | Shih et al. |
| 2002/0081292 A1 | 6/2002 | Jancys |
| 2003/0007958 A1 | 1/2003 | Chen |
| 2003/0096822 A1 | 5/2003 | Sabnis et al. |
| 2003/0232750 A1 | 12/2003 | Krieger et al. |
| 2003/0236203 A1 | 12/2003 | Freehauf et al. |
| 2004/0037869 A1 | 2/2004 | Cleverly et al. |
| 2004/0077601 A1 | 4/2004 | Adams et al. |
| 2004/0151759 A1 | 8/2004 | Cleverly et al. |
| 2004/0180034 A1 | 9/2004 | Hughes et al. |
| 2004/0198676 A1 | 10/2004 | Soll et al. |
| 2004/0234579 A1 | 11/2004 | Finke |
| 2004/0234580 A1 | 11/2004 | Huber et al. |
| 2005/0032718 A1 | 2/2005 | Burke et al. |
| 2005/0032719 A1 | 2/2005 | Cottrell et al. |
| 2005/0084490 A1 | 4/2005 | Adams et al. |
| 2005/0106202 A1 | 5/2005 | Sabnis et al. |
| 2005/0158367 A1 | 7/2005 | Hershberger |
| 2005/0176657 A1 | 8/2005 | Freehauf et al. |
| 2005/0186272 A1 | 8/2005 | Mattern et al. |
| 2005/0203322 A1 | 9/2005 | Harris et al. |
| 2005/0220869 A1* | 10/2005 | Stroppolo ............ A61K 9/2077 264/109 |
| 2005/0226908 A1 | 10/2005 | Huron et al. |
| 2005/0250970 A1 | 11/2005 | Harris et al. |
| 2006/0014802 A1 | 1/2006 | Billen et al. |
| 2006/0067954 A1 | 3/2006 | Cottrell et al. |
| 2006/0068020 A1 | 3/2006 | Cottrell et al. |
| 2006/0141009 A1 | 6/2006 | Huron et al. |
| 2006/0142624 A1 | 6/2006 | Harris et al. |
| 2006/0198850 A1 | 9/2006 | Razzak |
| 2006/0205681 A1 | 9/2006 | Moaddeb et al. |
| 2006/0222684 A1 | 10/2006 | Isele |
| 2006/0228399 A1 | 10/2006 | Rose et al. |
| 2006/0239928 A1 | 10/2006 | Heit et al. |
| 2006/0264423 A1 | 11/2006 | Wood et al. |
| 2006/0287257 A1 | 12/2006 | Stockel |
| 2007/0026056 A1 | 2/2007 | Rolf |
| 2007/0042013 A1 | 2/2007 | Soll et al. |
| 2007/0128239 A1 | 6/2007 | Hayes et al. |
| 2007/0155796 A1* | 7/2007 | Fujishima ................ A61P 1/04 514/338 |
| 2007/0190130 A1 | 8/2007 | Mark et al. |
| 2008/0027011 A1 | 1/2008 | Nached et al. |
| 2008/0075759 A1 | 3/2008 | Paulsen et al. |
| 2008/0146640 A1 | 6/2008 | Glinka |
| 2008/0171709 A1 | 7/2008 | Remmal |
| 2008/0171768 A1 | 7/2008 | Remmal |
| 2008/0188556 A1 | 8/2008 | Glinka et al. |
| 2008/0194694 A1 | 8/2008 | Comlay et al. |
| 2008/0200540 A1 | 8/2008 | Gibson et al. |
| 2008/0293645 A1 | 11/2008 | Schneider |
| 2008/0306138 A1 | 12/2008 | Zupan et al. |
| 2009/0011007 A1 | 1/2009 | Meier et al. |
| 2009/0036458 A1 | 2/2009 | Fattohi et al. |
| 2009/0036498 A1 | 2/2009 | Taylor |
| 2009/0098200 A1 | 4/2009 | Krayz et al. |
| 2009/0137524 A1 | 5/2009 | Billen et al. |
| 2009/0264479 A1 | 10/2009 | Black et al. |
| 2009/0312371 A1 | 12/2009 | Billen et al. |
| 2010/0010093 A1 | 1/2010 | Comlay et al. |
| 2010/0035980 A1 | 2/2010 | Gibson et al. |
| 2010/0087497 A1 | 4/2010 | Albright et al. |
| 2010/0113359 A1 | 5/2010 | Gant et al. |
| 2010/0120782 A1 | 5/2010 | Sabnis et al. |
| 2010/0125089 A1 | 5/2010 | Soll et al. |

(56) References Cited

U.S. PATENT DOCUMENTS

| | | |
|---|---|---|
| 2010/0144888 A1 | 6/2010 | Bessette |
| 2010/0159001 A1 | 6/2010 | Cardinal et al. |
| 2010/0197571 A1 | 8/2010 | Kanikanti et al. |
| 2010/0226943 A1 | 9/2010 | Brennan et al. |
| 2010/0254959 A1 | 10/2010 | Lahm et al. |
| 2010/0266628 A1 | 10/2010 | Razzak et al. |
| 2010/0286154 A1 | 11/2010 | Wieland-Berghausen et al. |
| 2010/0304998 A1 | 12/2010 | Sem |
| 2010/0305056 A1 | 12/2010 | Isabel et al. |
| 2011/0015153 A1 | 1/2011 | Taylor |
| 2011/0039794 A1 | 2/2011 | Corgozinho et al. |
| 2011/0059175 A9 | 3/2011 | Janssens et al. |
| 2011/0059988 A1 | 3/2011 | Heckeroth et al. |
| 2011/0105976 A1 | 5/2011 | Berlin |
| 2011/0117014 A1 | 5/2011 | Norenberg |
| 2011/0144046 A1 | 6/2011 | Hillier |
| 2011/0150780 A1 | 6/2011 | Krieger et al. |
| 2011/0152312 A1 | 6/2011 | Fallois et al. |
| 2011/0160218 A1 | 6/2011 | Holmes et al. |
| 2011/0165237 A1 | 7/2011 | Mark et al. |
| 2011/0196011 A1 | 8/2011 | Billen et al. |
| 2011/0223234 A1 | 9/2011 | Paulsen et al. |
| 2011/0245157 A1 | 10/2011 | Meng |
| 2011/0245191 A1 | 10/2011 | Rosentel, Jr. et al. |
| 2011/0263520 A1 | 10/2011 | Horikoshi et al. |
| 2011/0294751 A1 | 12/2011 | Costa et al. |
| 2012/0034273 A1 | 2/2012 | Kanikanti et al. |
| 2012/0035122 A1 | 2/2012 | Vaillancourt et al. |
| 2012/0046296 A1 | 2/2012 | Isele |
| 2012/0052108 A1 | 3/2012 | Graaff et al. |
| 2012/0071484 A1 | 3/2012 | Reynolds |
| 2012/0077765 A1 | 3/2012 | Curtis et al. |
| 2012/0101053 A1 | 4/2012 | Black et al. |
| 2012/0134975 A1 | 5/2012 | Hyde et al. |
| 2012/0141574 A1 | 6/2012 | Paulsen et al. |
| 2012/0196821 A1 | 8/2012 | Sargent et al. |
| 2012/0231032 A1 | 9/2012 | Meijs et al. |
| 2012/0232026 A1 | 9/2012 | Curtis et al. |
| 2012/0238516 A1 | 9/2012 | Cleverly et al. |
| 2012/0238517 A1 | 9/2012 | Cassayre et al. |
| 2012/0255502 A1 | 10/2012 | Holmes |
| 2012/0277249 A1 | 11/2012 | Andersson et al. |
| 2012/0289470 A1 | 11/2012 | Heit et al. |
| 2012/0316124 A1 | 12/2012 | Pitterna et al. |
| 2012/0329769 A1 | 12/2012 | Qacemi et al. |
| 2013/0023488 A1 | 1/2013 | Wu |
| 2013/0046019 A1 | 2/2013 | Geschwind et al. |
| 2013/0052250 A1 | 2/2013 | Burgess et al. |
| 2013/0059795 A1 | 3/2013 | Lo et al. |
| 2013/0065846 A1 | 3/2013 | Soll et al. |
| 2013/0085064 A1 | 4/2013 | Hoegger et al. |
| 2013/0090296 A1 | 4/2013 | Cho et al. |
| 2013/0143956 A1 | 6/2013 | Cady et al. |
| 2013/0197006 A1 | 8/2013 | Kanikanti et al. |
| 2013/0203692 A1 | 8/2013 | Soll et al. |
| 2013/0210623 A1 | 8/2013 | Cassayre et al. |
| 2013/0225412 A1 | 8/2013 | Lodriche et al. |
| 2013/0225516 A1 | 8/2013 | Soll et al. |
| 2013/0243886 A1 | 9/2013 | Hu et al. |
| 2013/0244962 A1 | 9/2013 | Isabel et al. |
| 2013/0274302 A1 | 10/2013 | Fuchs et al. |
| 2013/0281501 A1 | 10/2013 | Fuchs et al. |
| 2013/0331348 A1 | 12/2013 | Paulsen et al. |
| 2014/0011758 A1 | 1/2014 | Vaillancourt et al. |
| 2014/0019437 A1 | 1/2014 | Hays et al. |
| 2014/0079798 A1 | 3/2014 | Merzouk et al. |
| 2014/0079799 A1 | 3/2014 | Ghawi et al. |
| 2014/0079800 A1 | 3/2014 | Ghawi et al. |
| 2014/0086833 A1 | 3/2014 | Norenberg |
| 2014/0094418 A1 | 4/2014 | Isele |
| 2014/0107056 A1 | 4/2014 | Cassayre et al. |
| 2014/0107057 A1 | 4/2014 | Cassayre et al. |
| 2014/0107161 A1 | 4/2014 | Cassayre et al. |
| 2014/0127320 A1 | 5/2014 | Salamone et al. |
| 2014/0128358 A1 | 5/2014 | Cassayre et al. |
| 2014/0179623 A1 | 6/2014 | Turberg et al. |
| 2014/0199296 A1 | 7/2014 | Bannister et al. |
| 2014/0206633 A1 | 7/2014 | Mulholland et al. |
| 2014/0228577 A1 | 8/2014 | Cassayre et al. |
| 2014/0235533 A1 | 8/2014 | Smejkai et al. |
| 2014/0235869 A1 | 8/2014 | Cassayre et al. |
| 2014/0243375 A1 | 8/2014 | Qacemi et al. |
| 2014/0243408 A1 | 8/2014 | Conder et al. |
| 2014/0315794 A1 | 10/2014 | Fallois et al. |
| 2014/0315839 A1 | 10/2014 | Horikoshi et al. |
| 2014/0323559 A1 | 10/2014 | Cady et al. |
| 2014/0343004 A1 | 11/2014 | Derrieu et al. |
| 2014/0348787 A1 | 11/2014 | Simmons |
| 2014/0356448 A1 | 12/2014 | Ghawi et al. |
| 2014/0363518 A1 | 12/2014 | Ghawi et al. |
| 2014/0371179 A1 | 12/2014 | Simmons |
| 2014/0378415 A1 | 12/2014 | Cassayre et al. |
| 2015/0011596 A1 | 1/2015 | Fuchs et al. |
| 2015/0038440 A1 | 2/2015 | Chubb et al. |
| 2015/0057239 A1 | 2/2015 | Freehauf et al. |
| 2015/0086645 A1 | 3/2015 | Ghawi et al. |
| 2015/0099006 A1 | 4/2015 | Ghawi et al. |
| 2015/0111936 A1 | 4/2015 | Heckeroth et al. |
| 2015/0119377 A1 | 4/2015 | Sheehan et al. |
| 2015/0164047 A1 | 6/2015 | Watts et al. |
| 2015/0164816 A1 | 6/2015 | Jaklenec et al. |
| 2015/0164864 A1 | 6/2015 | Soll et al. |
| 2015/0182562 A1 | 7/2015 | Ghawi et al. |
| 2015/0183785 A1 | 7/2015 | Fallois et al. |
| 2015/0190417 A1 | 7/2015 | Cleverly et al. |
| 2015/0196607 A1 | 7/2015 | Ghawi et al. |
| 2015/0209355 A1 | 7/2015 | Chubb et al. |
| 2015/0216887 A1 | 8/2015 | Derrieu et al. |
| 2015/0216888 A1 | 8/2015 | Bellaire et al. |
| 2015/0223463 A1 | 8/2015 | Wendt et al. |
| 2015/0224052 A1 | 8/2015 | Paulsen et al. |
| 2015/0231069 A1 | 8/2015 | Modi |
| 2015/0272120 A1 | 10/2015 | Qacemi et al. |
| 2015/0289518 A1 | 10/2015 | Andersch et al. |
| 2015/0291612 A1 | 10/2015 | Greenwood et al. |
| 2015/0320046 A1 | 11/2015 | Rawal et al. |
| 2015/0342889 A1 | 12/2015 | Kanikanti et al. |
| 2015/0353532 A1 | 12/2015 | Lu et al. |
| 2015/0359764 A1 | 12/2015 | Geschwind et al. |
| 2015/0359825 A1 | 12/2015 | Ghawi et al. |
| 2015/0359826 A1 | 12/2015 | Ghawi et al. |
| 2016/0008436 A1 | 1/2016 | Cook et al. |
| 2016/0008471 A1 | 1/2016 | Batt et al. |
| 2016/0015689 A1 | 1/2016 | Fuchs et al. |
| 2016/0016927 A1 | 1/2016 | Lu et al. |
| 2016/0024026 A1 | 1/2016 | Fischer et al. |
| 2016/0024027 A1 | 1/2016 | Fischer et al. |
| 2016/0051519 A1 | 2/2016 | Soll et al. |
| 2016/0051524 A1 | 2/2016 | Rose et al. |
| 2016/0052907 A1 | 2/2016 | Cassayre et al. |
| 2016/0082073 A1 | 3/2016 | Hu et al. |
| 2016/0120913 A1 | 5/2016 | Ghawi et al. |
| 2016/0120914 A1 | 5/2016 | Ghawi et al. |
| 2016/0165888 A1 | 6/2016 | Horikoshi et al. |
| 2016/0184223 A1 | 6/2016 | Cleverly et al. |
| 2016/0193151 A1 | 7/2016 | Escobar et al. |
| 2016/0220505 A1 | 8/2016 | Krayz et al. |
| 2016/0220566 A1 | 8/2016 | Rosentel, Jr. et al. |
| 2016/0235720 A1 | 8/2016 | Foster et al. |
| 2016/0256442 A1 | 9/2016 | Cady et al. |
| 2016/0286808 A1 | 10/2016 | Rawal et al. |
| 2016/0287728 A1 | 10/2016 | Norenberg |
| 2016/0296499 A1 | 10/2016 | Wendt et al. |
| 2016/0303086 A1 | 10/2016 | Williams et al. |
| 2016/0317439 A1 | 11/2016 | Lehay et al. |
| 2016/0317502 A1 | 11/2016 | Heckeroth et al. |
| 2016/0331789 A1 | 11/2016 | Ghawi et al. |
| 2016/0331790 A1 | 11/2016 | Ghawi et al. |
| 2016/0332975 A1 | 11/2016 | Heckeroth et al. |
| 2016/0346278 A1 | 12/2016 | Andersson et al. |
| 2016/0347829 A1 | 12/2016 | Nordgren et al. |
| 2016/0354358 A1 | 12/2016 | Sacchettini et al. |
| 2016/0361297 A1 | 12/2016 | Soll et al. |
| 2016/0368883 A1 | 12/2016 | Pitterna et al. |

(56) References Cited

U.S. PATENT DOCUMENTS

| | | |
|---|---|---|
| 2016/0374994 A1 | 12/2016 | Soll et al. |
| 2017/0020849 A1 | 1/2017 | Soll et al. |
| 2017/0020955 A1 | 1/2017 | Bondesen et al. |
| 2017/0022197 A1 | 1/2017 | Fallois et al. |
| 2017/0071207 A1 | 3/2017 | Cassayre et al. |
| 2017/0135347 A1 | 5/2017 | Kagami |
| 2017/0152250 A1 | 6/2017 | Cassayre et al. |
| 2017/0157040 A1 | 6/2017 | Kluger et al. |
| 2017/0172971 A1 | 6/2017 | Andersson et al. |
| 2017/0189425 A1 | 7/2017 | Bannister et al. |
| 2017/0202968 A1 | 7/2017 | Lo et al. |
| 2017/0216216 A1 | 8/2017 | Jaklenec et al. |
| 2017/0239218 A1 | 8/2017 | Fallois et al. |
| 2017/0239301 A1 | 8/2017 | Ghawi et al. |
| 2017/0247361 A1 | 8/2017 | Cassayre et al. |
| 2017/0283405 A1 | 10/2017 | Lu et al. |
| 2017/0290766 A1 | 10/2017 | Alteheld et al. |
| 2017/0311601 A1 | 11/2017 | Yang et al. |
| 2017/0320873 A1 | 11/2017 | Maillard et al. |
| 2017/0333601 A1 | 11/2017 | Burgess et al. |
| 2017/0340779 A1 | 11/2017 | Burgess et al. |
| 2017/0348263 A1* | 12/2017 | Ohlstein .............. A61K 9/0065 |
| 2017/0348286 A1 | 12/2017 | Williams et al. |
| 2017/0354593 A1 | 12/2017 | Majumdar et al. |
| 2017/0360045 A1 | 12/2017 | Renga et al. |
| 2018/0000743 A1 | 1/2018 | Welker et al. |
| 2018/0085352 A1 | 3/2018 | Fuchs et al. |
| 2018/0153170 A1 | 6/2018 | Cassayre et al. |
| 2018/0155301 A1 | 6/2018 | Heckeroth et al. |
| 2018/0155339 A1 | 6/2018 | Waechtler et al. |
| 2018/0169073 A1 | 6/2018 | Flochlay-Sigognault et al. |
| 2018/0207093 A1 | 7/2018 | Cannon et al. |
| 2018/0221338 A1 | 8/2018 | Soll et al. |
| 2018/0243333 A1 | 8/2018 | Brown et al. |
| 2018/0251428 A1 | 9/2018 | Eberhardt et al. |
| 2018/0263905 A1 | 9/2018 | Kluger et al. |
| 2018/0271883 A1 | 9/2018 | Bannister et al. |
| 2018/0296556 A1 | 10/2018 | Andersson et al. |
| 2018/0340034 A1 | 11/2018 | Hood |
| 2018/0354917 A1 | 12/2018 | Vries et al. |
| 2018/0361010 A1 | 12/2018 | McDermott et al. |
| 2019/0016686 A1 | 1/2019 | Cirilli et al. |
| 2019/0070158 A1 | 3/2019 | Corrales et al. |
| 2019/0071407 A1 | 3/2019 | Pitterna et al. |
| 2019/0091133 A1 | 3/2019 | Hansen |
| 2019/0105305 A1 | 4/2019 | Soll et al. |
| 2019/0133129 A1 | 5/2019 | Yang et al. |
| 2019/0166842 A1 | 6/2019 | Cassayre et al. |
| 2019/0192486 A1 | 6/2019 | Heckeroth et al. |
| 2019/0200610 A1 | 7/2019 | Horikoshi et al. |
| 2019/0201332 A1 | 7/2019 | Alteheld et al. |
| 2019/0216784 A1 | 7/2019 | Soll et al. |
| 2019/0269765 A1 | 9/2019 | Lim et al. |
| 2019/0290474 A1 | 9/2019 | Simpson et al. |
| 2019/0315728 A1 | 10/2019 | Cassayre et al. |
| 2019/0336442 A1 | 11/2019 | Kluger et al. |
| 2019/0343808 A1 | 11/2019 | Flochlay-Sigognault et al. |
| 2019/0375725 A1 | 12/2019 | Zhang et al. |
| 2019/0375860 A1 | 12/2019 | Welker et al. |
| 2020/0000720 A1 | 1/2020 | Lehay et al. |
| 2020/0011856 A1 | 1/2020 | Bondesen et al. |
| 2020/0022959 A1 | 1/2020 | Cady et al. |
| 2020/0030232 A1 | 1/2020 | McDonnell et al. |
| 2020/0030797 A1 | 1/2020 | Shartle et al. |
| 2020/0031822 A1 | 1/2020 | Subramanian et al. |
| 2020/0038370 A1 | 2/2020 | Fallois et al. |
| 2020/0061637 A1 | 2/2020 | Shartle et al. |
| 2020/0069591 A1 | 3/2020 | Kanikanti et al. |
| 2020/0113823 A1 | 4/2020 | Kanikanti et al. |
| 2020/0147076 A1 | 5/2020 | Andersson et al. |
| 2020/0270219 A1 | 8/2020 | Vries et al. |
| 2020/0282014 A1 | 9/2020 | Hoffman et al. |
| 2020/0315172 A1 | 10/2020 | Horikoshi et al. |
| 2020/0324014 A1 | 10/2020 | McDermott et al. |
| 2020/0331867 A1 | 10/2020 | Schenck et al. |
| 2020/0339559 A1 | 10/2020 | Hawryluk et al. |
| 2020/0360290 A1 | 11/2020 | Garcia et al. |
| 2020/0383330 A1 | 12/2020 | Cassayre et al. |
| 2020/0390688 A1 | 12/2020 | Hepler et al. |
| 2020/0390748 A1 | 12/2020 | Sheehan et al. |
| 2020/0399675 A1 | 12/2020 | Chou et al. |
| 2020/0405692 A1 | 12/2020 | Williams et al. |
| 2021/0022344 A1 | 1/2021 | Yang |
| 2021/0030776 A1 | 2/2021 | Pate |
| 2021/0061775 A1 | 3/2021 | Heckeroth et al. |
| 2021/0087164 A1 | 3/2021 | Zhang et al. |
| 2021/0100247 A1 | 4/2021 | Hanai |
| 2021/0161867 A1 | 6/2021 | Freehauf et al. |
| 2021/0177749 A1 | 6/2021 | Freehauf et al. |
| 2021/0177808 A1 | 6/2021 | Freehauf et al. |
| 2021/0220360 A1 | 7/2021 | Kolhe et al. |
| 2021/0220393 A1 | 7/2021 | Brown et al. |
| 2021/0236420 A1 | 8/2021 | Kluger et al. |
| 2021/0252024 A1 | 8/2021 | Bannister et al. |
| 2021/0283093 A1 | 9/2021 | Nov et al. |
| 2021/0299104 A1 | 9/2021 | Cady et al. |
| 2021/0353537 A1 | 11/2021 | Lehay et al. |
| 2021/0354283 A1 | 11/2021 | Flochlay-Sigognault et al. |
| 2021/0355139 A1 | 11/2021 | Dickhaut et al. |
| 2021/0361666 A1 | 11/2021 | Lautenschlager et al. |
| 2021/0379023 A1 | 12/2021 | Rose et al. |
| 2022/0017473 A1 | 1/2022 | Fallois et al. |
| 2022/0046921 A1 | 2/2022 | Nakamura et al. |
| 2022/0048874 A1 | 2/2022 | Schmitt |
| 2022/0073479 A1 | 3/2022 | Schmitt |
| 2022/0125924 A1 | 4/2022 | Cleverly et al. |
| 2022/0142984 A1 | 5/2022 | Alteheld et al. |
| 2022/0143005 A1 | 5/2022 | Guzel et al. |
| 2022/0153833 A1 | 5/2022 | Bosques et al. |
| 2022/0201983 A1 | 6/2022 | Allan et al. |
| 2022/0202938 A1 | 6/2022 | Batt et al. |
| 2022/0205878 A1 | 6/2022 | Zohdy et al. |
| 2022/0226393 A1 | 7/2022 | Sahin et al. |
| 2022/0241368 A1 | 8/2022 | Hoffman et al. |
| 2022/0259176 A1 | 8/2022 | Zhang et al. |
| 2022/0296564 A1 | 9/2022 | Colon et al. |
| 2022/0323421 A1 | 10/2022 | Northrup et al. |
| 2022/0323472 A1 | 10/2022 | Spallitta |
| 2022/0338475 A1 | 10/2022 | Seino et al. |
| 2022/0387391 A1 | 12/2022 | Hsu |
| 2022/0401357 A1 | 12/2022 | McDonnell et al. |
| 2023/0000082 A1 | 1/2023 | Cassayre et al. |
| 2023/0000774 A1 | 1/2023 | Johnson et al. |
| 2023/0017661 A1 | 1/2023 | Herrera et al. |
| 2023/0040279 A1 | 2/2023 | Davies et al. |
| 2023/0087923 A1 | 3/2023 | Soll et al. |
| 2023/0095926 A1 | 3/2023 | O'Neill et al. |
| 2023/0146944 A1 | 5/2023 | Hawryluk et al. |
| 2023/0157288 A1 | 5/2023 | Sakanishi |
| 2023/0190894 A1 | 6/2023 | Lim et al. |
| 2023/0233530 A1 | 7/2023 | Freehauf et al. |

FOREIGN PATENT DOCUMENTS

| | | |
|---|---|---|
| DE | 4317449 A1 | 11/1994 |
| EP | 2662075 A1 | 11/2013 |
| EP | 208244541 A1 | 8/2020 |
| JP | 2010-529059 A | 8/2010 |
| JP | 2015-512435 A | 4/2015 |
| KR | 2021005334 A1 | 12/2021 |
| WO | 1993001799 A1 | 2/1993 |
| WO | 1993018779 A1 | 9/1993 |
| WO | 9523590 A1 | 9/1995 |
| WO | 1995023590 A1 | 9/1995 |
| WO | 1996014068 A1 | 5/1996 |
| WO | 9638165 A2 | 12/1996 |
| WO | 9806407 A1 | 2/1998 |
| WO | 1998012196 A1 | 3/1998 |
| WO | 1998018610 A1 | 5/1998 |
| WO | 1998040401 A2 | 9/1998 |
| WO | 1999018796 A2 | 4/1999 |
| WO | 1999027906 A1 | 6/1999 |
| WO | 1999047073 A1 | 9/1999 |
| WO | 1999063824 A2 | 12/1999 |

(56) References Cited

FOREIGN PATENT DOCUMENTS

| | | |
|---|---|---|
| WO | 2000021504 A1 | 4/2000 |
| WO | 2000030449 A1 | 6/2000 |
| WO | 2000030625 A2 | 6/2000 |
| WO | 2000059475 A1 | 10/2000 |
| WO | 2001060380 A1 | 8/2001 |
| WO | 2001060409 A1 | 8/2001 |
| WO | 2002/045693 A1 | 6/2002 |
| WO | 2002078714 A1 | 10/2002 |
| WO | 2003030653 A2 | 4/2003 |
| WO | 2003/075895 A1 | 9/2003 |
| WO | 2003086469 A1 | 10/2003 |
| WO | 2004000034 A2 | 12/2003 |
| WO | 2004004658 A2 | 1/2004 |
| WO | 2004006906 A2 | 1/2004 |
| WO | 2004012521 A1 | 2/2004 |
| WO | 2004014143 A1 | 2/2004 |
| WO | 2004016252 A1 | 2/2004 |
| WO | 2004052400 A1 | 6/2004 |
| WO | 2004062600 A2 | 7/2004 |
| WO | 2004069242 A1 | 8/2004 |
| WO | 2004089239 A2 | 10/2004 |
| WO | 2004105504 A2 | 12/2004 |
| WO | 2005013714 A1 | 2/2005 |
| WO | 2005016356 A1 | 2/2005 |
| WO | 2005016357 A1 | 2/2005 |
| WO | 2005016358 A1 | 2/2005 |
| WO | 2005072536 A1 | 8/2005 |
| WO | 2005/079759 A2 | 9/2005 |
| WO | 2005081612 A2 | 9/2005 |
| WO | 2005090967 A2 | 9/2005 |
| WO | 2005099692 A1 | 10/2005 |
| WO | 2006/036624 A2 | 4/2006 |
| WO | 2006/036625 A2 | 4/2006 |
| WO | 2006089082 A2 | 8/2006 |
| WO | 2006120495 A1 | 11/2006 |
| WO | 2006134466 A1 | 12/2006 |
| WO | 2007012180 A1 | 2/2007 |
| WO | 2007024719 A2 | 3/2007 |
| WO | 2007067470 A2 | 6/2007 |
| WO | 2007075827 A2 | 7/2007 |
| WO | 2007090721 A1 | 8/2007 |
| WO | 2007097936 A2 | 8/2007 |
| WO | 2007115381 A2 | 10/2007 |
| WO | 2008005276 A2 | 1/2008 |
| WO | 2008072985 A2 | 6/2008 |
| WO | 2008076256 A1 | 6/2008 |
| WO | 2008076259 A1 | 6/2008 |
| WO | 2008096231 A1 | 8/2008 |
| WO | 2008102232 A1 | 8/2008 |
| WO | 2008133982 A2 | 11/2008 |
| WO | 2008134819 A1 | 11/2008 |
| WO | 2008/148484 A1 | 12/2008 |
| WO | 2008148027 A1 | 12/2008 |
| WO | 2008151214 A2 | 12/2008 |
| WO | 2009002809 A2 | 12/2008 |
| WO | 2009/023013 A1 | 2/2009 |
| WO | 2009018186 A2 | 2/2009 |
| WO | 2009018198 A1 | 2/2009 |
| WO | 2009024541 A2 | 2/2009 |
| WO | 2009035908 A1 | 3/2009 |
| WO | 2009040818 A1 | 4/2009 |
| WO | 2009047584 A1 | 4/2009 |
| WO | 2009053466 A1 | 4/2009 |
| WO | 2009062939 A1 | 5/2009 |
| WO | 2009063044 A1 | 5/2009 |
| WO | 2009064859 A1 | 5/2009 |
| WO | 2009067797 A1 | 6/2009 |
| WO | 2009111040 A1 | 9/2009 |
| WO | 2009151646 A2 | 12/2009 |
| WO | 2010021555 A1 | 2/2010 |
| WO | 2010042395 A1 | 4/2010 |
| WO | 2010054042 A2 | 5/2010 |
| WO | 2010056999 A1 | 5/2010 |
| WO | 2010059719 A2 | 5/2010 |
| WO | 2010/063387 A1 | 6/2010 |
| WO | 2010071218 A1 | 6/2010 |
| WO | 2010106046 A1 | 9/2010 |
| WO | 2010109214 A2 | 9/2010 |
| WO | 2010116267 A1 | 10/2010 |
| WO | 2010120195 A1 | 10/2010 |
| WO | 2010126857 A1 | 11/2010 |
| WO | 2010141596 A2 | 12/2010 |
| WO | 2010148488 A1 | 12/2010 |
| WO | 2011027333 A1 | 3/2011 |
| WO | 2011048040 A1 | 4/2011 |
| WO | 2011054066 A2 | 5/2011 |
| WO | 2011067272 A1 | 6/2011 |
| WO | 2011075591 A1 | 6/2011 |
| WO | 2011075592 A1 | 6/2011 |
| WO | 2011098579 A1 | 8/2011 |
| WO | 2011101229 A1 | 8/2011 |
| WO | 2011101402 A1 | 8/2011 |
| WO | 2011104087 A1 | 9/2011 |
| WO | 2011104089 A1 | 9/2011 |
| WO | 2011109809 A2 | 9/2011 |
| WO | 2011123773 A1 | 10/2011 |
| WO | 2011127200 A2 | 10/2011 |
| WO | 2011154433 A2 | 12/2011 |
| WO | 2011161209 A1 | 12/2011 |
| WO | 2012017359 A2 | 2/2012 |
| WO | 2012028556 A1 | 3/2012 |
| WO | 2012032360 A2 | 3/2012 |
| WO | 2012038851 A1 | 3/2012 |
| WO | 2012045700 A1 | 4/2012 |
| WO | 2012049156 A1 | 4/2012 |
| WO | 2012049327 A2 | 4/2012 |
| WO | 2012084852 A2 | 6/2012 |
| WO | 2012089622 A2 | 7/2012 |
| WO | 2012089623 A2 | 7/2012 |
| WO | 2012120399 A1 | 9/2012 |
| WO | 2012127347 A1 | 9/2012 |
| WO | 2012148799 A1 | 11/2012 |
| WO | 2012156400 A1 | 11/2012 |
| WO | 2012163948 A1 | 12/2012 |
| WO | 2012163959 A1 | 12/2012 |
| WO | 2013026726 A1 | 2/2013 |
| WO | 2013026929 A1 | 2/2013 |
| WO | 2013026930 A1 | 2/2013 |
| WO | 2013026933 A1 | 2/2013 |
| WO | 2013037626 A1 | 3/2013 |
| WO | 2013037650 A1 | 3/2013 |
| WO | 2013039948 A1 | 3/2013 |
| WO | 2013050302 A1 | 4/2013 |
| WO | 2013057624 A1 | 4/2013 |
| WO | 2013082373 A1 | 6/2013 |
| WO | 2013092942 A1 | 6/2013 |
| WO | 2013116230 A1 | 8/2013 |
| WO | 2013119442 A1 | 8/2013 |
| WO | 2013126694 A1 | 8/2013 |
| WO | 2013129688 A1 | 9/2013 |
| WO | 2013135674 A1 | 9/2013 |
| WO | 2013150055 A1 | 10/2013 |
| WO | 2013169622 A1 | 11/2013 |
| WO | 2014001120 A1 | 1/2014 |
| WO | 2014001121 A1 | 1/2014 |
| WO | 2014033230 A1 | 3/2014 |
| WO | 2014039422 A1 | 3/2014 |
| WO | 2014039475 A1 | 3/2014 |
| WO | 2014049447 A2 | 4/2014 |
| WO | 2014053555 A1 | 4/2014 |
| WO | 2014072480 A1 | 5/2014 |
| WO | 2014074289 A1 | 5/2014 |
| WO | 2014079825 A1 | 5/2014 |
| WO | 2014079935 A1 | 5/2014 |
| WO | 2014079937 A1 | 5/2014 |
| WO | 2014079941 A1 | 5/2014 |
| WO | 2014081800 A1 | 5/2014 |
| WO | 2014086750 A2 | 6/2014 |
| WO | 2014095845 A1 | 6/2014 |
| WO | 2014108571 A2 | 7/2014 |
| WO | 2014114250 A1 | 7/2014 |
| WO | 2014117236 A1 | 8/2014 |
| WO | 2014132227 A1 | 9/2014 |
| WO | 2014135095 A1 | 9/2014 |

(56) References Cited

FOREIGN PATENT DOCUMENTS

| | | |
|---|---|---|
| WO | 2014141223 A1 | 9/2014 |
| WO | 2014169092 A1 | 10/2014 |
| WO | 2014172871 A1 | 10/2014 |
| WO | 2014189837 A1 | 11/2014 |
| WO | 2015048371 A1 | 4/2015 |
| WO | 2015055497 A1 | 4/2015 |
| WO | 2015066162 A1 | 5/2015 |
| WO | 2015071668 A1 | 5/2015 |
| WO | 2015086551 A1 | 6/2015 |
| WO | 2015091898 A1 | 6/2015 |
| WO | 2015091900 A1 | 6/2015 |
| WO | 2015095185 A1 | 6/2015 |
| WO | 2015100232 A2 | 7/2015 |
| WO | 2015127089 A1 | 8/2015 |
| WO | 2015132592 A1 | 9/2015 |
| WO | 2015169723 A1 | 11/2015 |
| WO | 2016002790 A1 | 1/2016 |
| WO | 2016018872 A1 | 2/2016 |
| WO | 2016018875 A1 | 2/2016 |
| WO | 2016073347 A1 | 5/2016 |
| WO | 2016073991 A2 | 5/2016 |
| WO | 2016078758 A1 | 5/2016 |
| WO | 2016078765 A1 | 5/2016 |
| WO | 2016099929 A1 | 6/2016 |
| WO | 2016102437 A1 | 6/2016 |
| WO | 2016111725 A1 | 7/2016 |
| WO | 2016138339 A1 | 9/2016 |
| WO | 2016161369 A1 | 10/2016 |
| WO | 2016164487 A1 | 10/2016 |
| WO | 2016191389 A2 | 12/2016 |
| WO | 2016196401 A1 | 12/2016 |
| WO | 2016207234 A1 | 12/2016 |
| WO | 2016209635 A1 | 12/2016 |
| WO | 2017021992 A1 | 2/2017 |
| WO | 2017036577 A1 | 3/2017 |
| WO | 2017083326 A1 | 5/2017 |
| WO | 2017087941 A1 | 5/2017 |
| WO | 2017108954 A1 | 6/2017 |
| WO | 2017117627 A1 | 7/2017 |
| WO | 2017147352 A1 | 8/2017 |
| WO | 2017151971 A2 | 9/2017 |
| WO | 2017176948 A1 | 10/2017 |
| WO | 2017201010 A1 | 11/2017 |
| WO | 2017216541 A1 | 12/2017 |
| WO | 2018004906 A1 | 1/2018 |
| WO | 2018039508 A1 | 3/2018 |
| WO | 2018053029 A1 | 3/2018 |
| WO | 2018090100 A1 | 5/2018 |
| WO | 2018104150 A1 | 6/2018 |
| WO | 2018141063 A1 | 8/2018 |
| WO | 2018148392 A1 | 8/2018 |
| WO | 2018177970 A1 | 10/2018 |
| WO | 2018178322 A1 | 10/2018 |
| WO | 2018187623 A1 | 10/2018 |
| WO | 2018195530 A1 | 10/2018 |
| WO | 2019021191 A1 | 1/2019 |
| WO | 2019028133 A1 | 2/2019 |
| WO | 2019034763 A1 | 2/2019 |
| WO | 2019091936 A1 | 5/2019 |
| WO | 2019091940 A1 | 5/2019 |
| WO | 2019115492 A1 | 6/2019 |
| WO | 2019122324 A1 | 6/2019 |
| WO | 2019157241 A1 | 8/2019 |
| WO | 2019176676 A1 | 9/2019 |
| WO | 2019236274 A1 | 12/2019 |
| WO | 2019236656 A1 | 12/2019 |
| WO | 2019245891 A1 | 12/2019 |
| WO | 2020012044 A1 | 1/2020 |
| WO | 2020041549 A1 | 2/2020 |
| WO | 2020051106 A1 | 3/2020 |
| WO | 2020054835 A1 | 3/2020 |
| WO | 2020069138 A1 | 4/2020 |
| WO | 2020077284 A1 | 4/2020 |
| WO | 2020112374 A1 | 6/2020 |
| WO | 2020127878 A1 | 6/2020 |
| WO | 2020127935 A1 | 6/2020 |
| WO | 2020139291 A1 | 7/2020 |
| WO | 2020150032 A1 | 7/2020 |
| WO | 2020161105 A1 | 8/2020 |
| WO | 2020181100 A1 | 9/2020 |
| WO | 2020219871 A1 | 10/2020 |
| WO | 2020222187 A1 | 11/2020 |
| WO | 2020225143 A1 | 11/2020 |
| WO | 2020231372 A1 | 11/2020 |
| WO | 2020252269 A1 | 12/2020 |
| WO | 2021013825 A1 | 1/2021 |
| WO | 2021054315 A1 | 3/2021 |
| WO | 2021078126 A1 | 4/2021 |
| WO | 2021078412 A1 | 4/2021 |
| WO | 2021111143 A1 | 6/2021 |
| WO | 2021113419 A1 | 6/2021 |
| WO | 2021119464 A1 | 6/2021 |
| WO | 2021122513 A1 | 6/2021 |
| WO | 2021122515 A1 | 6/2021 |
| WO | 2021122521 A1 | 6/2021 |
| WO | 2021174069 A1 | 9/2021 |
| WO | 2021200488 A1 | 10/2021 |
| WO | 2021233967 A1 | 11/2021 |
| WO | 2021241898 A1 | 12/2021 |
| WO | 2021242481 A1 | 12/2021 |
| WO | 2022033553 A1 | 2/2022 |
| WO | 2022049149 A1 | 3/2022 |
| WO | 2022051478 | 3/2022 |
| WO | 2022087326 A1 | 4/2022 |
| WO | 2022119840 A1 | 6/2022 |
| WO | 2022124342 A1 | 6/2022 |
| WO | 2022140728 A1 | 6/2022 |
| WO | 2022155352 A1 | 7/2022 |
| WO | 2022171150 A1 | 8/2022 |
| WO | 2022173727 A1 | 8/2022 |
| WO | 2022212399 A1 | 10/2022 |
| WO | 2022230804 A1 | 11/2022 |
| WO | 2022258797 A1 | 12/2022 |
| WO | 2022269042 A1 | 12/2022 |
| WO | 2023111148 A1 | 6/2023 |
| WO | 2023111157 A1 | 6/2023 |
| WO | 2023114564 A1 | 6/2023 |
| WO | 2023117900 A1 | 6/2023 |
| WO | 2023118394 A1 | 6/2023 |
| WO | 2023118426 A1 | 6/2023 |
| WO | 2023118553 A1 | 6/2023 |
| WO | 2023118555 A1 | 6/2023 |
| WO | 2023118557 A1 | 6/2023 |
| WO | 2023118558 A1 | 6/2023 |
| WO | 2023122523 A1 | 6/2023 |
| WO | 2023122525 A1 | 6/2023 |
| WO | 2023122526 A1 | 6/2023 |
| WO | 2023126969 A1 | 7/2023 |
| WO | 2023131615 A1 | 7/2023 |

OTHER PUBLICATIONS

Munster, et al., "Multiparticulate system combining taste masking and immediate release properties for the aversive compound praziquantel," European Journal of Pharmaceutical Sciences, vol. 109, pp. 446-454 (Sep. 5, 2017).

Gokhale, R, et al., "High-Shear Granulation", Handbook of Pharmaceutical Granulation Technology, Chapter 7, pp. 191-228 (2005).

Third Party Observations submitted Jul. 17, 2025.

Walther, FM, et al., "Safety of Concurrent Treatment of Dogs with Fluralaner (Bravecto™) and Milbemycin Oxime-Praziquantel", Parasites & Vectors, vol. 7, No. 481, pp. 1-3 (2014).

* cited by examiner

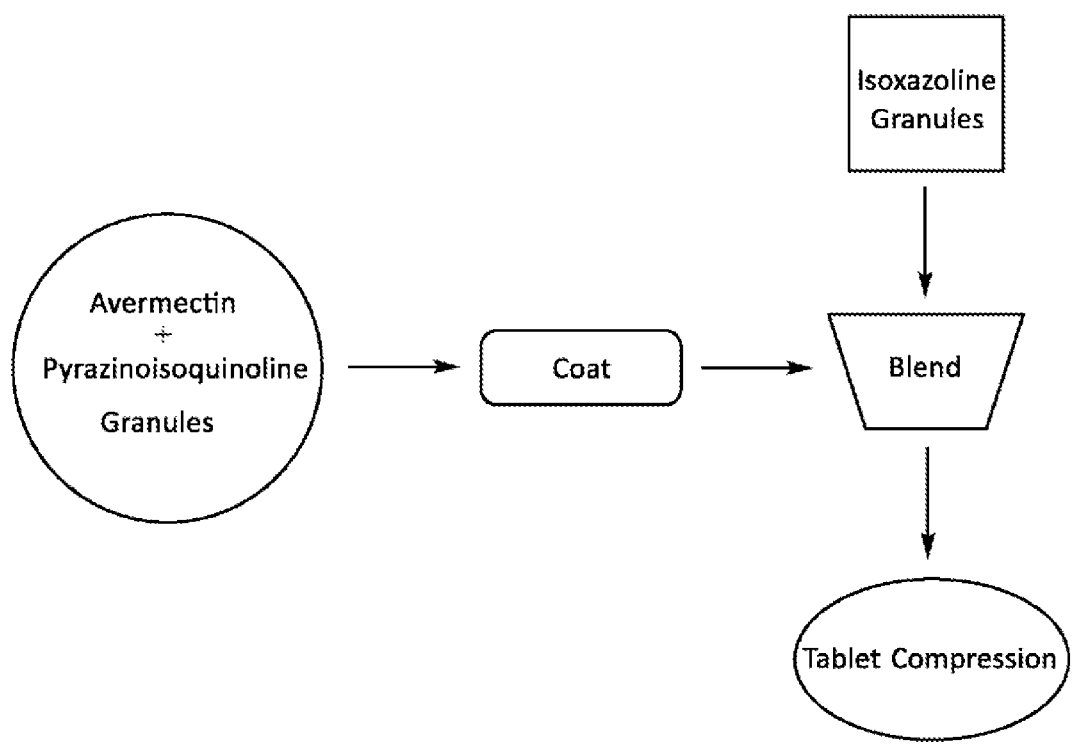

PALATABLE FORMULATIONS

CROSS-REFERENCE TO RELATED APPLICATIONS

This application is a National Stage entry of International Application No. PCT/US2021/048842, filed Sep. 2, 2021, which claims priority to U.S. Provisional Patent Application No. 63/075,055, filed Sep. 4, 2020, the entire contents of each of which are incorporated herein by reference.

BACKGROUND

Technical Field

The present disclosure relates to palatable veterinary compositions, processes for preparing the same, and to methods of using the same, for example, for the treatment of parasitic infections.

Description of Related Art

Ectoparasites such as fleas, lice, flies, mosquitoes, ticks and mites, as well as endoparasites such as gastrointestinal tract nematodes, flukes, and filaroids, are problematic for man and animal alike. Such parasites seriously impact productivity in the domesticated animal industry by reducing weight gain, causing poor quality hide, wool, and meat, and in some cases resulting in death. Parasites are also responsible, in part, for the spread of disease and discomfort in mammals, including food and companion animals. Ectoparasites in particular are known to harbor and transmit a variety of microbial pathogens, including bacteria, viruses and protozoan parasites, many of which are pathogenic to humans, other warm-blooded mammals, and birds. Ectoparasites have been implicated in a number of diseases including, for example, malaria, lymphatic- and blood-born filariasis, trachoma, trypanosomiasis, Leishmaniasis, Rocky Mountain Spotted Fever, Lyme Disease, babesiosis, and food-borne illnesses due to *Salmonella, E. coli* and *Campylobacter*, as well as others.

The significant health implications of parasitic infestations have boosted the development of reagents capable of controlling parasites and parasitic infestations in plants and animals. Common methods for controlling parasitic infestation generally focus on methods that incorporate one or more insecticides, which in many situations may prove unsuccessful or unsatisfactory for any number of reasons including, for example, (1) failure of administration compliance (frequent administration by owner required); (2) behavioral or physiological intolerance of the animal to the pesticide product or means of administration; (3) the emergence of ectoparasites resistant to the reagent; and (4) negative impact on the environment and/or toxicity.

In the field of veterinary medicine, oral administration of medicaments is desirable because it can often be carried out without the involvement of a veterinarian. However, creating oral veterinary products incorporating multiple active agents requires consideration of several variables, including, drug solubility, drug bioavailability, palatability, active agent stability, toxicity, safety, efficacy (potency and duration), resistance, issues relating to any side effect(s), and patient/owner compliance with the administration schedule.

WO/2002/045693 A1 discloses a preparation with an active ingredient essentially uniformly dispersed in an excipient matrix composed of one or more excipients selected from the group of fatty alcohol, triglyceride, partial glyceride and fatty acid ester. WO/2003/075895 A1 discloses an animal medicine in an application form, which contains the active ingredient in a stabilized form that masks the taste, and which is readily taken orally by an animal. WO/2005/079759A2 discloses a pharmaceutical composition for oral application comprising: i) an anthelmintic agent; ii) a first excipient having a porous structure with an inner surface of about 500 to 1500 m$^2$/g and a surface area according to BET of up to about 5000 m$^2$/g. WO/2006/036624A2 discloses a lipid-based system for isolating components in a pharmaceutical formulation.

WO/2006/036625A2 discloses lipid-based pharmaceutical formulations containing ivermectin, praziquantel and pyrantel pamoate, and methods for preparing the formulations.

WO/2008/148484 A1 discloses extrudates which contain one or more pharmaceutically active substances and have a maximum bar diameter of 0.5 mm. WO/2009/023013A1 discloses a multiparticulate in-feed additive composition comprising praziquantel or a salt thereof and cimetidine or a salt thereof. WO/2010/063387A1 discloses extrudates comprising at least one pharmaceutically active substance in the shape of pins, wherein the ratio of particle sizes of the spicular pharmaceutically active substance to the strand diameter is at least 1:15.

WO/2020/051106A1 discloses a palatable, hard chewable composition that comprises at least one veterinary acceptable isoxazoline, a stabilized macrocyclic lactone, an acceptable salt form of pyrantel, at least one natural animal based palatant, and at least one veterinary acceptable excipient.

BRIEF DESCRIPTION OF THE DRAWINGS

FIG. 1 shows an exemplary embodiment to produce the disclosed compositions.

DETAILED DESCRIPTION

This disclosure provides oral dosage formulations comprising an effective amount of an isoxazoline parasiticidal agent, an avermectin, and a pyrazinoisoquinoline, and optionally one or more additional active ingredients, such as a tetrahydropyrimidine. The formulations and methods not only provide alternatives to those that currently exist in the art, but also overcome one or more limitations associated with current formulations such as, drug solubility, drug bioavailability, palatability, active agent stability, toxicity, safety, efficacy (potency and duration), spectrum of parasiticidal activity, resistance, issues relating to any side effect(s), or patient/owner compliance with administration.

In one aspect, the present disclosure provides oral dosage formulations including an isoxazoline, moxidectin, and praziquantel, and optionally pyrantel or a salt thereof. Praziquantel is a bitter and obnoxious smelling active, which can lead to the rejection of the dosage form by a patient. Moxidectin is a labile active, sensitive to exposure to acid, alkali, light, and oxidizing conditions, and thus can present stability issues when incorporating it into an oral dosage formulation.

Furthermore, both actives are poorly soluble in water, creating challenges for bioavailability.

It has been discovered that praziquantel can be successfully taste/odor-masked by confining the praziquantel to discrete areas within the matrix of the oral dosage formulation. This is accomplished by preparing a mixture of praziquantel granules to provide a first granulate; optionally coating the first granulate with a physiologically acceptable polymer matrix (e.g., polymethacrylate-based copolymer matrix); preparing granules of one or more additional actives to provide a second granulate; combining the first and second granulates and at least one pharmaceutically acceptable excipient to provide a third blend (which may also be referred to as the "third granulate"); and compressing this blend (the "final mixture" or "ready-to-press mixture") into a tablet.

It has further been discovered that co-granulating moxidectin with the praziquantel provides a granulate in which moxidectin is sufficiently stable for the present purposes. This is accomplished by preparing a mixture of praziquantel and moxidectin granules to provide a first granulate; optionally coating the first granulate with a physiologically acceptable polymer matrix (e.g., polymethacrylate-based copolymer matrix); preparing granules of an isoxazoline and optionally one or more additional actives to provide a second granulate; combining the first and second granulates and at least one pharmaceutically acceptable excipient to provide a third blend; and compressing the ready-to-press mixture into a tablet.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The term, "administering to a subject" includes but is not limited to cutaneous, subcutaneous, intramuscular, mucosal, submucosal, transdermal, oral or intranasal administration.

Administration could include injection or topical administration.

The term, "chewable" refers to a solid form, which can be taken by mouth and crushed into smaller pieces before swallowing.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "salt" refers to salts of veterinary or pharmaceutically acceptable organic acids and bases or inorganic acids and bases. Such salts are well known in the art and include those described in Journal of Pharmaceutical Science, 66, 2-19 (1977).

The skilled artisan will appreciate that certain of the compounds of the present invention exist as isomers. All stereoisomers of the compounds of the invention, including geometric isomers, enantiomers, and diastereomers, in any ratio, are contemplated to be within the scope of the present invention.

The skilled artisan will also appreciate that certain of the compounds of the present invention exist as tautomers. All tautomeric forms the compounds of the invention are contemplated to be within the scope of the present invention.

Compounds of the invention also include all isotopic variations, in which at least one atom of the predominant atom mass is replaced by an atom having the same atomic number, but an atomic mass different from the predominant atomic mass. Use of isotopic variations (e.g., deuterium, $^2$H) may afford greater metabolic stability. Additionally, certain isotopic variations of the compounds of the invention may incorporate a radioactive isotope (e.g., tritium, $^3$H, or $^{14}$C), which may be useful in drug and/or substrate tissue distribution studies. Substitution with positron emitting isotopes, such as $^{11}$C, $^{18}$F, $^{15}$O and $^{13}$N, may be useful in Positron Emission Topography (PET) studies.

The terms "compounds of the invention" and "a compound of the invention" and "compounds of the present invention" and a like include the chemical compounds, in particular the active ingredients (also referred to as "actives") described herein and the exemplified compounds described herein and a salt of each of these embodiments.

The terms "treating", "to treat", "treated", or "treatment", include without limitation restraining, slowing, stopping or reversing the progression or severity of an existing symptom or disease. The terms "control", "controlling" or "controlled" refers to include without limitation decreasing, reducing, or ameliorating the risk of a symptom, disorder, condition, or disease, and protecting an animal from a symptom, disorder, condition, or disease. Controlling may refer to therapeutic, prophylactic, or preventative administration. For example, a larvae or immature heartworm infection would be controlled by acting on the larvae or immature parasite preventing the infection from progressing to an infection by mature parasites.

The term "preventing" refers to the avoidance of a symptom or disease developing in an animal. The terms "subject" and "patient" refers includes humans and non-human mammalian animals, such as dogs, cats, mice, rats, guinea pigs, rabbits, ferrets, cows, horses, sheep, goats, and pigs. It is understood that a more particular subject is a human. Also, a more particular subject are mammalian pets or companion animals, such as dogs and cats and also mice, guinea pigs, ferrets, and rabbits.

The term "effective amount" refers to an amount which gives the desired benefit to the subject, and includes administration for treatment or control. The amount will vary from one individual subject to another and will depend upon a number of factors, including the overall physical condition of the subject and the severity of the underlying cause of the condition to be treated, concomitant treatments, and the amount of compound of the invention used to maintain desired response at a beneficial level.

An effective amount can be readily determined by the attending diagnostician, as one skilled in the art, by the use of known techniques and by observing results obtained under analogous circumstances. In determining the effective amount, the dose, a number of factors are considered by the attending diagnostician, including, but not limited to: the species of patient; its size, age, and general health; the specific condition, disorder, infection, or disease involved; the degree of or involvement or the severity of the condition, disorder, or disease, the response of the individual patient; the particular compound administered; the mode of administration; the bioavailability characteristics of the preparation administered; the dose regimen selected; the use of concomitant medication; and other relevant circumstances. An effective amount of the present disclosure, the active ingredient treatment dosage, may range from, for example, 0.5 mg to 100 mg. Specific amounts can be determined by the skilled person. Although these dosages are based on a subject having a mass of about 1 kg to about 20 kg, the diagnostician will be able to determine the appropriate dose for a subject whose mass falls outside of this weight range. An effective amount of the present disclosure, the active ingredient treatment dosage, may range from, for example, 0.1 mg to 10 mg/kg of the subject. The dosing regimen is expected to be daily, weekly, or monthly administration.

The phrases "oral bioavailability" and "bioavailability upon oral administration" as used herein refer to the systemic availability (i.e., blood/plasma levels) of a given amount of active administered to a patient.

The term "clearance" as used herein refers to the removal of a substance from the blood, e.g., by renal excretion, expressed in terms of the volume flow of blood or plasma that would contain the amount of substance removed per unit time.

The term "half-life" as used herein refers to the period of time required for one-half of an amount of a substance to be lost through biological processes.

The term "bioavailability" as used herein refers to the physiological availability of a given amount of a drug, as distinct from its chemical potency. The term may also refer to the proportion of the administered dose which is absorbed into the bloodstream.

The term "animal" is used herein to include all vertebrate animals, including humans, companion animals, and livestock animals. It also includes an individual animal in all stages of development, including embryonic and fetal stages. Companion animals include, but are not limited to, dogs and cats. Livestock animals include, but are not limited to, cattle, camelids, pigs, sheep, goats and horses.

The term "parasite" as used herein refers to a pest which lives in or on the host animal and benefits by deriving nutrients at the host animal's expense. The term encompasses all stages in the lifecycle of the pest. An "endoparasite" is a parasite which lives in the host animal. An "ectoparasite" is a parasite which lives on the host animal.

The term "wt/wt" or "w/w" designates weight/weight, the term "w/v" designates weight/volume, and the term "mg/kg" designates milligrams per kilogram of body weight. The term "% wt/wt" represents the percentage by weight of an ingredient in the recipe of a composition.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. COMPOSITIONS

Actives

Compositions of the present disclosure include an isoxazoline class parasiticide, an avermectin (e.g., ivermectin, selamectin, doramectin, eprinomectin, moxidectin, and abamectin), and a pyrazinoisoquinoline (e.g., praziquantel). The compositions optionally include one or more additional actives, such as for example, a milbemycin (e.g., milbemycin oxime), a benzimidazole (e.g., fenbendazole, albendazole, and triclabendazole), a salicylanilide (e.g., closantel and oxyclozanide), a substituted phenol (e.g., nitroxynil), a tetrahydropyrimidine (e.g., pyrantel, morantel, oxantel), an imidazothiazole (e.g., levamisole), or a cyclooctadepsipeptide (e.g., emodepside).

The isoxazoline class parasiticide may have the formula:

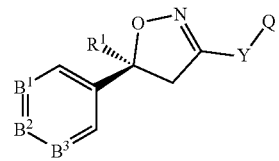

wherein $B^1$, $B^2$, $B^3$, are each independently C—R or N; each R is independently H, halogen, cyano, —$NO_2$, alkyl, haloalkyl, alkoxy, haloalkoxy, alkylthio, haloalkylthio, alkylsulfinyl, haloalkylsulfinyl, alkylsulfonyl, haloalkylsulfonyl, alkylamino, dialkylamino or alkoxycarbonyl; $R^1$ is $C_1$-$C_3$alkyl or $C_1$-$C_3$haloalkyl; Y is an optionally substituted phenylene, naphthylene, indanylene, a 5- or 6-membered heteroarylene or an 8-10-membered fused heterobicyclylene, wherein the optional substituents are selected from the group consisting of halogen, alkyl, haloalkyl, cycloalkyl, halocycloalkyl, alkoxy, haloalkoxy, alkylthio, haloalkylthio, alkylsulfinyl, haloalkylsulfinyl, alkylsulfonyl, haloalkylsulfonyl, alkylamino, dialkylamino, —CN or —$NO_2$ and $NH_2$—C(=S)—; Q is T-$NR^2R^3$, the group (—$CH_2$—)(—$CH_2$—)N—$R^3$, OH, $NH_2$, alkoxy, haloalkoxy, alkylamino, haloalkylamino, dialkylamino, halodialkylamino, thiol, alkylthio, haloalkylthio, alkylsulfinyl, haloalkylsulfinyl, alkylsulfonyl, haloalkylsulfonyl, or an optionally substituted 5- or 6-membered carbocyclyl, heterocyclyl or heteroaryl ring; T is $(CH_2)_n$, $CH(CH_3)$, CH(CN), C(=O) or C(=S); $R^2$ is H, alkyl, alkenyl, alkynyl, cycloalkyl, alkylcycloalkyl, cycloalkylalkyl, alkylcarbonyl or alkoxycarbonyl; $R^3$ is H, $OR^7$, $NR^8R^9$ or $Q^1$; or alkyl, haloalkyl, alkenyl, haloalkenyl, alkynyl, haloalkynyl, cycloalkyl, alkylcycloalkyl, cycloalkylalkyl, alkylcarbonyl, alkoxycarbonyl, aminocarbonyl, alkylaminocarbonyl or dialkylaminocarbonyl, each optionally substituted with one or more substituents independently selected from $R^4$; or $R^2$ and $R^3$ are taken together with the nitrogen to which they are attached to form a ring containing 2 to 6 atoms of carbon and optionally one additional atom selected from the group consisting of N, S and O, said ring optionally substituted with 1 to 4 substituents independently selected from the group consisting of alkyl, halogen, —CN, —$NO_2$ and alkoxy; each $R^4$ is independently halogen, alkyl, cycloalkyl, alkoxy, alkylthio, haloalkylthio, alkylsulfinyl, haloalkylsulfinyl, alkylsulfonyl, haloalkylsulfonyl, alkylamino, haloalkylamino, dialkylamino, dihaloalkylamino, cycloalkylamino, alkylcarbonyl, alkoxycarbonyl, alkylaminocarbonyl, dialkylaminocarbonyl, haloalkyl carbonyl, haloalkoxycarbonyl, haloalkylaminocarbonyl, dihaloalkylaminocarbonyl, hydroxy, —$NH_2$, —CN or —$NO_2$; or $Q^2$; each $R^5$ is independently halogen, alkoxy, haloalkoxy, alkylthio, haloalkylthio, alkylsulfinyl, haloalkylsulfinyl, alkylsulfonyl, haloalkylsulfonyl, alkylamino, dialkylamino, alkoxycarbonyl, CN or —$NO_2$; each $R^6$ is independently halogen, alkyl, haloalkyl, cycloalkyl, halocycloalkyl, alkoxy, haloalkoxy, alkylthio, haloalkylthio, alkylsulfinyl, haloalkylsulfinyl, alkylsulfonyl, haloalkylsulfonyl, alkylamino, dialkylamino, —CN, —$NO_2$, phenyl or pyridinyl; $R^7$ is H; or alkyl, alkenyl, alkynyl, cycloalkyl, alkylcycloalkyl or cycloalkylalkyl, each optionally substituted with one of more halogen; $R^8$ is H, alkyl, alkenyl, alkynyl, cycloalkyl, alkylcycloalkyl, cycloalkylalkyl, alkylcarbonyl or alkoxycarbonyl; $R^9$ is H; $Q^3$; or alkyl, alkenyl, alkynyl, cycloalkyl, alkylcycloalkyl or cycloalkylalkyl, each optionally substituted with one or more substituents independently selected from R⁴; or R⁸ and R⁹ are taken together with the nitrogen to which they are attached to form a ring containing 2 to 6 atoms of carbon and optionally one additional atom selected from the group consisting of N, S and O, said ring optionally substituted with 1 to 4 substituents independently selected from the group consisting of alkyl, halogen, —CN, —NO₂ and alkoxy; $Q^1$ is a phenyl ring, a 5- or 6-membered heterocyclic ring, or an 8-, 9- or 10-membered fused bicyclic ring system optionally containing one to three heteroatoms selected from up to 1 O, up to 1 S and up to 3 N, each ring or ring system optionally substituted with one or more substituents independently selected from $R^5$; $Q^2$ is independently a phenyl ring or a 5- or 6-membered heterocyclic ring, each ring optionally substituted with one or more substituents independently selected from $R^6$; $Q^3$ is a phenyl ring or a 5- or 6-membered heterocyclic ring, each ring optionally substituted with one or more substituents independently selected from $R^6$; and n is 1, 2 or 3; wherein the asterisk represents that the carbon atom is a quaternary carbon atom. Exemplary isoxazoline class parasiticides include afoxolaner, fluralaner, lotilaner, and sarolaner.

In certain embodiments, the compositions include an insecticide or acaricide. Exemplary insecticides and acaricides include, for example, acephate, acetamiprid, acetoprole, amitraz, amidoflumet, avermectin, azadirachtin, azinphos-methyl, bifenthrin, bifenazate, buprofezin, bistrifluron, buprofezin, carbofuran, cartap, chlorfenapyr, chlorfluazuron, chlorantraniliprole), chlorpyrifos, chlorpyrifos-methyl, chromafenozide, clothianidin, cyflumetofen, cyfluthiin, P-cyfluthrin, cyhalothrin, y-cyhalothrin k-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim, flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, monocrotophos, nitenpyram, nithiazine, novaluron, noviflumuron, oxamyl, parathion, parathiori-methyl, permethrin, phorate, phosalone, phosmet; phosphamidori, pirimicarb, profenofos, profluthrin, protrifenbute, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen, spirotetramat, sulprofos, tebufenozide, teflubenzuron, tefluthrin, terbufos, tetrachlorvinphos, thiacloprid, thiamethoxam, thiodicarb, thiosultap-sodium, tolfenpyrad, tralomethrin, triazamate, trichlorfon, and triflumuron.

In certain embodiments, the compositions include active ingredient(s) ranging from 0.005% to 80% (wt/wt), based on total weight of the dosage form. In certain embodiments, the compositions include active ingredient(s) at 1% to 50% (wt/wt), 5% to 50% (wt/wt), 10% to 50% (wt/wt), 15% to 50% (wt/wt/), 20% to 50% (wt/wt), 25% to 50% (wt/wt), 30% to 50% (wt/wt), 35% to 50% (wt/wt), 40% to 50% (wt/wt), 45% to 50% (wt/wt), 1% to 40% (wt/wt), 1% to 35% (wt/wt), 1% to 30% (wt/wt), 1% to 25% (wt/wt), 1% to 20% (wt/wt), 1% to 15% (wt/wt), 1% to 10% (wt/wt), 1% to 5% (wt/wt), 10% to 40% (wt/wt), 10% to 30% (wt/wt), 10% to 25% (wt/wt), 10% to 20% (wt/wt), 10% to 15% (wt/wt), 15% to 30% (wt/wt), 15% to 25% (wt/wt), 15% to 20% (wt/wt), 1% to 60% (wt/wt), 10% to 60% (wt/wt), 20% to 60% (wt/wt), 30% to 60% (wt/wt), or 40% to 60% (wt/wt), based on total weight of the dosage form.

In certain embodiments, the compositions provide, independently for each active ingredient, a dosage of 0.001 mg to 1000 mg per kg of the subject, preferably 0.01 mg to 100 mg per kg of the subject, more preferably 0.1 mg to 50 mg per kg of the subject, and even more preferably 0.1 mg to 10 mg per kg of the subject.

In certain embodiments, the compositions include, independently for each active ingredient, 0.01 mg to 1000 mg of active ingredient, preferably 0.1 to 500 mg of active ingredient, more preferably 0.5 mg to 100 mg of active ingredient. In a further embodiment, the compositions may include, independently for each active ingredient, 0.03 mg to 1000 mg of active ingredient or 0.06 mg to 500 mg of active ingredient.

In a preferred embodiment, the compositions include a combination of an isoxazoline class parasiticide (e.g., fluralaner, afoxolaner, sarolaner, or lotilaner), a macrocyclic lactone class parasiticide (e.g., milbemycin oxime, moxidectin, doramectin, or selamectin), and a pyrazinoisoquinoline class parasiticide (e.g., praziquantel). In another preferred embodiment, the compositions include a combination of an isoxazoline class parasiticide (e.g., fluralaner, afoxolaner, sarolaner, or lotilaner), a macrocyclic lactone class parasiticide (e.g., milbemycin oxime, moxidectin, or selamectin), a pyrazinoisoquinoline class parasiticide (e.g., praziquantel), and a tetrahydropyrimidine class parasiticide (e.g., pyrantel pamoate, pyrantel tartrate, morantel tartrate, or oxantel embonate).

In yet another preferred embodiment, the compositions include a combination of lotilaner, moxidectin, and praziquantel. In yet another preferred embodiment, the compositions include a combination of lotilaner, milbemycin oxime, and praziquantel. In yet another preferred embodiment, the compositions include a combination of lotilaner, moxidectin, praziquantel, and pyrantel or a salt thereof. In yet another preferred embodiment, the compositions include a combination of lotilaner, milbemycin oxime, praziquantel, and pyrantel or a salt thereof.

In yet another preferred embodiment, the compositions include a combination of 0.5% to 40% (wt/wt) of an isoxazoline (e.g., lotilaner, sarolaner, fluralaner, or afoxolaner), 0.005% to 1% (wt/wt) of a macrocyclic lactone (e.g., moxidectin, milbemycin oxime, doramectin, or selamectin), and 1% to 10% (wt/wt) of a pyrazinoisoquinoline (e.g., praziquantel), based on total weight of the dosage form.

In yet another preferred embodiment, the compositions provide a dosage of 1 mg/kg to 100 mg/kg of an isoxazoline (e.g., lotilaner, sarolaner, fluralaner, or afoxolaner), 0.001 mg/kg to 15 mg/kg of a macrocyclic lactone (e.g., moxidectin, milbemycin oxime, doramectin, or selamectin), and 1 mg/kg to 100 mg/kg of a pyrazinoisoquinoline (e.g., praziquantel).

In yet another preferred embodiment, the compositions include a combination of 0.5% to 40% (wt/wt) of an isoxazoline (e.g., lotilaner, sarolaner, fluralaner, or afoxolaner), 0.005% to 1% (wt/wt) of a macrocyclic lactone (e.g., moxidectin, milbemycin oxime, doramectin, or selamectin), 1% to 10% (wt/wt) of a pyrazinoisoquinoline (e.g., praziquantel), and 5% to 30% (wt/wt) of a tetrahydropyrimidine (e.g., pyrantel pamoate, pyrantel tartrate, morantel tartrate, or oxantel embonate), based on total weight of the dosage form.

In yet another preferred embodiment, the compositions provide a dosage of 1 mg/kg to 100 mg/kg of an isoxazoline (e.g., lotilaner, sarolaner, fluralaner, or afoxolaner), 0.001 mg/kg to 15 mg/kg of a macrocyclic lactone (e.g., moxidectin, milbemycin oxime, doramectin, or selamectin), 1 mg/kg to 100 mg/kg of a pyrazinoisoquinoline (e.g., praziquantel), and 1 mg/kg to 100 mg/kg of a tetrahydropyrimidine (e.g., pyrantel pamoate, pyrantel tartrate, morantel tartrate, or oxantel embonate).

In yet another preferred embodiment, the compositions include a combination of 0.5% to 40% (wt/wt) an isoxazoline (e.g., lotilaner, sarolaner, fluralaner, or afoxolaner), 0.005% to 1% (wt/wt) moxidectin, and 1% to 10% (wt/wt) praziquantel, based on total weight of the dosage form.

In yet another preferred embodiment, the compositions provide a dosage of 1 mg/kg to 100 mg/kg of an isoxazoline (e.g., lotilaner, sarolaner, fluralaner, or afoxolaner), 0.001 mg/kg to 5 mg/kg of moxidectin, and 1 mg/kg to 30 mg/kg of praziquantel.

In yet another preferred embodiment, the compositions include a combination of 0.5% to 40% (wt/wt) lotilaner, 0.005% to 1% (wt/wt) moxidectin, and 1% to 10% (wt/wt) praziquantel, based on total weight of the dosage form. In yet another preferred embodiment, the compositions include a combination of 30-40% (wt/wt) lotilaner, 0.025% to 0.045% (wt/wt) moxidectin, and 8-10% (wt/wt) praziquantel, based on total weight of the dosage form.

In yet another preferred embodiment, the compositions provide a dosage of 1 mg/kg to 100 mg/kg of lotilaner, 0.001 mg/kg to 5 mg/kg of moxidectin, and 1 mg/kg to 30 mg/kg of praziquantel. In yet another preferred embodiment, the compositions provide a dosage of 15 mg/kg to 45 mg/kg of lotilaner, 0.025 mg/kg to 0.50 mg/kg of moxidectin, and 1 mg/kg to 15 mg/kg of praziquantel. In yet another preferred embodiment, the compositions provide a dosage of 20 mg/kg to 40 mg/kg of lotilaner, 0.05 mg/kg to 0.10 mg/kg of moxidectin, and 5 mg/kg to 10 mg/kg of praziquantel. In yet another preferred embodiment, the compositions provide a dosage of 20 mg/kg to 40 mg/kg of lotilaner, 0.02 mg/kg to 0.04 mg/kg of moxidectin, and 5 mg/kg to 10 mg/kg of praziquantel.

In yet another preferred embodiment, the compositions include 20-1,000 mg of lotilaner, 0.001-200 mg of moxidectin, and 5-250 mg of praziquantel. In yet another preferred embodiment, the compositions include 55-57 mg of lotilaner, 0.1-0.2 mg of moxidectin, and 13-15 mg of praziquantel. In yet another preferred embodiment, the compositions include 111-113 mg of lotilaner, 0.2-0.3 mg of moxidectin, and 28-30 mg of praziquantel. In yet another preferred embodiment, the compositions include 224-226 mg of lotilaner, 0.5-0.6 mg of moxidectin, and 56-58 mg of praziquantel. In yet another preferred embodiment, the compositions include 449-451 mg of lotilaner, 1.1-1.2 mg of moxidectin, and 113-115 mg of praziquantel. In yet another preferred embodiment, the compositions include 899-901 mg of lotilaner, 2.2-2.3 mg of moxidectin, and 227-229 mg of praziquantel.

In yet another preferred embodiment, the compositions include a combination of 0.5% to 40% (wt/wt) of an isoxazoline (e.g., lotilaner, sarolaner, fluralaner, or afoxolaner), 0.005% to 1% (wt/wt) moxidectin, 1% to 10% (wt/wt) praziquantel, and 5% to 30% (wt/wt) pyrantel pamoate, based on total weight of the dosage form.

In yet another preferred embodiment, the compositions include a combination of 20-40% (wt/wt), preferably 20-30% (wt/wt) lotilaner, 0.02-0.045%, preferably 0.02-0.03 (wt/wt) moxidectin, and 5-10% (wt/wt), preferably 5-7% (wt/wt) praziquantel, and 5% to 30% (wt/wt), preferably 10% to 20% (wt/wt) pyrantel pamoate based on total weight of the dosage form. In yet another preferred embodiment, the compositions provide a dosage of 1 mg/kg to 100 mg/kg of an isoxazoline (e.g., lotilaner, sarolaner, fluralaner, or afoxolaner), 0.001 mg/kg to 5 mg/kg of moxi dectin, 1 mg/kg to 30 mg/kg of praziquantel, and 1 mg/kg to 30 mg/kg of pyrantel pamoate.

In yet another preferred embodiment, the compositions provide a combination of 0.5% to 40% (wt/wt) lotilaner, 0.005% to 1% (wt/wt) moxidectin, 1% to 10% (wt/wt) praziquantel, and 5% to 30% (wt/wt) pyrantel pamoate, based on total weight of the dosage form.

In yet another preferred embodiment, the compositions provide a dosage of 1 mg/kg to 100 mg/kg of lotilaner, 0.001 mg/kg to 5 mg/kg of moxidectin, 1 mg/kg to 30 mg/kg of praziquantel, and 1 mg/kg to 30 mg/kg of pyrantel pamoate. In yet another preferred embodiment, the compositions provide a dosage of 15 mg/kg to 45 mg/kg of lotilaner, 0.025 mg/kg to 0.50 mg/kg of moxidectin, 1 mg/kg to 15 mg/kg of praziquantel, and 1 mg/kg to 15 mg/kg of pyrantel pamoate. In yet another preferred embodiment, the compositions provide a dosage of 20 mg/kg to 40 mg/kg of lotilaner, 0.05 mg/kg to 0.10 mg/kg of moxidectin, 5 mg/kg to 10 mg/kg of praziquantel, and 5 mg/kg to 10 mg/kg of pyrantel pamoate. In yet another preferred embodiment, the compositions provide a dosage of 20 mg/kg to 40 mg/kg of lotilaner, 0.02 mg/kg to 0.04 mg/kg of moxidectin, 5 mg/kg to 10 mg/kg of praziquantel, and 5 mg/kg to 10 mg/kg of pyrantel pamoate.

In yet another preferred embodiment, the compositions include 20-1,000 mg of lotilaner, 0.001-200 mg of moxidectin, 5-250 mg of praziquantel, and 5-250 mg of pyrantel pamoate.

Protected Active Ingredients

In certain embodiments, one or more actives of the compositions may be incorporated into the dosage form as a coated granulate. Actives may be incorporated in the dosage forms as coated granulates to, for example, taste-mask unpalatable ingredients or shield a labile active ingredient from other actives or excipients in the dosage form matrix.

The coated granulates can be coated with, for example, a physiologically acceptable polymer matrix. The physiologically acceptable polymer matrix may include one or more polymers and optionally one or more plasticizers.

Suitable classes of polymer include, but are not limited to, shellac, a polymer on a cellulose, acrylic acid or methacrylic acid, maleic acid anhydride, polyvinyl pyrrolidone or polyvinyl alcohol basis. Other polymers may also be considered, e.g. polymers on a cellulose basis, e.g. produced from cellulose acetate phthalate or cellulose acetate-N,N-di-n-butylhydroxypropylether. The starting materials for polymers on an acrylic acid or methacrylic acid basis may be methacrylate/methacrylic acid copolymer, 2-methyl-5-vinyl-pyridine/methacrylate/methacrylic acid copolymer, methyl methacrylate/methacrylic acid copolymer, methyl methacrylate/methacrylic acid copolymer, methyl methacrylate/maleic acid anhydride copolymer, or methyl methacrylate/maleic acid anhydride copolymer.

Polymers on an acrylic acid or methacrylic acid basis are preferably used, e.g. polymerization products of acrylic acid and acrylic acid esters with a low content of quaternary ammonium groups, e.g. as commercially available under the names Eudragit® E, L or S from the company Rohm, (now Evonik) Darmstadt, Germany. Eudragit® E is a cationic polymer of dimethylaminoethyl methacrylate and a neutral methacrylic acid ester. Eudragit®L and S are anionic copolymers of methacrylic acid and methacrylic acid methylester. Eudragit®E 100 is a pH-dependent cationic polymer, which dissolves in the gastric juices at an acidic pH value of up to pH 5.0. Above pH 5.0, it is capable of swelling. In powder form, it is known and commercially available as Eudragit® EPO. Eudragit® EPO has the advantage that the process can be carried out in an aqueous medium and optionally without organic solvents.

In a preferred embodiment, the physiologically acceptable polymer matrix comprises a poly(meth)acrylate polymer such as Eudragit® RL 100, Eudragit® RL PO, Eudragit® RL 30D, Eudragit® RL 12.5, Eudragit® RS 100, Eudragit® RS PO, Eudragit® RS 30D, Eudragit® RS 12.5, Eudragit® NE 30D, or Eudragit® NE 40D, all available from Evonik.

In an even more preferred embodiment, the physiologically acceptable polymer matrix comprises Eudragit® RL (which may for example be used as an aqueous dispersion of Eudragit® RL 100 with 30% dry substance: Eudragit® RL 30D) Eudragit® RL is a copolymer of acrylic and methacrylic esters with a low content of quaternary ammonium groups, the molar ratio of ammonium groups to the remaining neutral (meth)acrylic esters being 1:20 in Eudragit® RL. The mean molecular weight is about 32,000. The code designation RL refers to the light retardation properties of the agent.

Suitable plasticizers for inclusion in the physiologically acceptable polymer matrix include, for example, triethyl citrate, polyethylene glycol, dibutyl phthalate, diethylphthalate and triacetin. In certain embodiments, the plasticizer is provided as a 20% aqueous emulsion comprising glycerol monostearate, triethyl citrate, and polysorbate 80 (e.g., PlasACRYL® HTP20; Evonik Corporation). In a preferred embodiment, PlasACRYL® HTP20 is formulated with EUDRAGIT® RL 30 D to provide the physiologically acceptable polymer matrix coating the granulate materials.

Coating as used herein includes a full or partial coating of the material; therefore, according to one embodiment, coated material as described herein may refer to a partially coated agglomerate. Coating of the active-containing granulate can be affected by spraying a solution or suspension of polymer-containing material onto the granulate. Volatile components (e.g., water or an organic solvent) can be subsequently removed (e.g. by application of heat and/or under vacuum). After the drying process, the coated granulate may be sieved.

Suitable solvents for dissolution of the polymer are, for example, solvents which are relatively readily volatile, e.g. one or more of the following: methanol, ethanol, isopropanol, butanol, benzyl alcohol, ethylene glycol, propylene glycol, phenol, acetone, acetic acid, acetic acid anhydride, nitromethane, ethylene diamine, acetic acid cellosolve, e.g. an acetone-ethanol mixture, e.g. in a ratio of 1:1. Aqueous suspensions or solutions may be used, for example coating may be carried out with Eudragit® EPO or Eudragit® RL 30D from an aqueous dispersion. According to this process, safety aspects, environmental protection and economical advantages are optimally combined.

Excipients

The compositions optionally include one or more acceptable excipients. The term "acceptable excipient" refers to those typically used in preparing veterinary and pharmaceutical compositions and preferably are pure and non-toxic in the amounts used. They generally are a solid, semisolid, or liquid material, which in the aggregate can serve as a vehicle or medium for the active ingredient. Some examples of acceptable excipients are found in Remington's Pharmaceutical Sciences and the Handbook of Pharmaceutical Excipients and include diluents, vehicles, carriers, ointment bases, binders, disintegrants, lubricants, glidants, sweetening agents, flavoring agents, gel bases, sustained release matrices, stabilizing agents, preservatives, solvents, suspending agents, buffers, emulsifiers, dyes, propellants, coating agents, and others.

The present compositions may comprise one or more flavouring agents to improve the palatability. In particular, the compositions may comprise a meat flavouring. Exemplary flavorants include, but are not limited to, Flavorpal® flavourings, Desiccated Pork Liver Powder™, Provesta® 356, Provesta® 400, PC-0125, Symtripal® flavourings, for example Symtripal® chicken cooked dry flavor, Symtripal® meat chopped type dry flavor, Symtripal® liver type dry flavor and Symtripal® chicken skin and meat dry flavor. As an additional example, Diana Pet Food's "D'TECH 8P0910748 VEGGIE" may be mentioned which is marketed as a "palatability enhancer". Meat or beef flavorings used in exemplary embodiments may be naturally derived or artificially formulated to have a meat or beef flavor. Natural flavorings are often made up of dried and pulverized or powdered meat which may be obtained from domesticated meat animals including cattle such as cows or bulls, pigs, deer, sheep, goats, poultry which may include turkey, chicken, duck and the like. Non-animal, often plant derived flavorings, include soy, peanuts, fruits, sweeteners, honey, sugar, maple syrup and fructose, parsley, celery, peppermint, spearmint, garlic, and the like. In exemplary embodiments, flavorants may optionally be included in the compositions, for example, in concentrations of 0.5% to 40% (wt/wt), based on total weight of the dosage form. In a preferred embodiment, the flavouring is Symtripal® meat type dry flavor or Symtripal® liver type dry flavor. In another preferred embodiment the flavoring is Symtripal® liver type dry flavor in combination with D'TECH 8P0910748 VEGGIE. In a preferred embodiment, the composition comprises 0.5 to 20% (wt/wt), preferably 5 to 15% (wt/wt) of flavoring, which may be one flavoring or a combination of at least two flavorings.

The present compositions may comprise a surfactant. A surfactant (also known as a surfaceactive agent) is a component which lowers surface tension at the interface between two liquids or between a liquid and solid. Suitable surfactants can be found in REMINGTON: THE SCIENCE AND PRACTICE OF PHARMACY (20$^{th}$ ed., Mack Publishing Co., 2001). Exemplary surfactants include, but are not limited to, glyceryl monooleate, polyoxyethylene sorbitan fatty acid esters, sorbitan esters including sorbitan monooleate (Span® 20), polyvinyl alcohol, polysorbates including polysorbate 20 and polysorbate 80, d-a-tocopheryl polyethylene glycol 1000 succinate (TPGS), Vitamin E TPGS (D-a-Tocopheryl polyethylene glycol 1000 succinate), sodium lauryl sulfate (SLS), co-polymers of ethylene oxide and propylene oxide (e.g. poloxamers such as Poloxamer 124, 188, 338, and 407, and LUTROL® F87 and the like), polyethylene glycol castor oil derivatives including polyoxyl 35 castor oil (Cremophor® EL), polyoxyl 40 hydrogenated castor oil (Cremophor® RH 40), polyoxyl 60 hydrogenated castor oil (Cremophor® RH60); propylene glycol monolaurate (LAUROGLYCOL®); glyceride esters including glycerol caprylate/caprate (CAPMUL® MCM), polyglycolized glycerides (GELUCIRE®, such as Gelucire® 44/14), PEG 300 caprylic/capric glycerides (Softigen® 767), PEG 400 caprylic/capric glycerides (Labrasol®), PEG 300 oleic glycerides (Labrafil® M-1944CS), PEG 300 linoleic glycerides (Labrafil® M-2125CS); polyethylene glycol stearates and polyethylene glycol hydroxy stearates including polyoxyl 8 stearate (PEG 400 monostearate), polyoxyl 40 stearate (PEG 1750 monostearate), PEG3350, and the like. Polyethylene glycol stearates (synonyms include macrogol stearates, polyoxyl stearates, polyoxyethylene stearates, ethoxylated stearates; CAS No. 9004-99-3, 9005 August 7) are mixtures of mono- and distearate esters of mixed polyoxyethylene polymers. Polyethylene glycol hydroxy stearate is a mixture of mono- and diesters of hydroxystearic acid with polyethylene glycols. One polyethylene glycol hydroxystearate that may be used in the compositions is polyethylene glycol 12-hydroxy stearate. The compositions may include the surfactant polyethylene glycol 15 12-hydroxystearate (Solutol® HS 15 from BASF), a mixture of mono- and diesters of 12-hydroxy stearic acid with 15 moles of ethylene oxide. The compositions may include polyoxyl 35 castor oil (Cremophor® EL) as a surfactant. The compositions may include polyoxyl 40 hydrogenated castor oil (Cremophor® RH 40) or polyoxyl 60 hydrogenated castor oil (Cremophor® RH60) as surfactants. In exemplary embodiments, surfactants may optionally be included in the compositions, for example, in concentrations of about 0.1% to about 10% (wt/wt), or 0.005% to about 5% (wt/wt), or 0.01% to about 1% (wt/wt) based on total weight of the dosage form. In a further embodiment, the composition comprises 0.5 to 5% (w/w) or 0.01% to about 5% (wt/wt), preferably 0.01% to about 1% (wt/wt) sodium lauryl sulfate.

The present compositions may comprise a solvent. Exemplary solvents include, but are not limited to, glycerol anhydrous (CAS 56-81-5), various grades of liquid polyethylene glycol (PEG) including PEG 200, PEG 300, PEG 400 and PEG 540; propylene carbonate; propylene glycol; triglycerides including, but not limited to caprylic/capric triglyceride, caprylic/capric/linoleic triglyceride (e.g. MIGLYOL® 810 and 812), caprylic/capric/succinic triglyceride, propylene glycol dicaprylate/dicaprate, and the like; water, sorbitol solution, glycerol caprylate/caprate and polyglycolized glycerides (GELUCIRER), or a combination thereof. Further exemplary solvents include medium chain triglycerides (MCTs) and vegetable oils termed long-chain triglycerides (LCTs). Triglycerides of medium-chain length fatty acids, known as medium-chain triglycerides or MCTs, can be synthesized by esterifying glycerol with fatty acids of carbon chain lengths of C8 or CIO. MCTs are usually commercially-available as a mixture of glycerol esters of C8 (octanoic acid or caprylic acid) and CIO (decanoic acid or capric acid) fatty acids, with small amounts (<1% of each) of glycerol esters of C6 (hexanoic acid or caproic acid) and C12 (dodecanoic acid or lauric acid) fatty acids. In exemplary embodiments, solvents may optionally be included in the compositions, for example, in concentrations of about 1 to about 50% (wt/wt), based on total weight of the dosage form. According to a further embodiment the present compositions are essentially free of solvents (where "essentially free" means that no solvents are added as an ingredient per se but the composition may contain traces of solvents which may be present in the various components or may remain from any production steps).

The present compositions may comprise a filler. Exemplary fillers include, but are not limited to, corn starch, pre-gelatinized corn starch, soy protein fines, corn cob, corn gluten meal, dibasic calcium phosphate hydrous or anhydrous, microcrystalline cellulose (MCC), and lactose hydrous or anhydrous. In exemplary embodiments, fillers may optionally be included in the compositions, for example, in concentrations of about 5% to about 80% (wt/wt).

The present compositions may comprise a binder. A binder is a component which increases cohesiveness. Suitable binders can be found in REMINGTON: THE SCIENCE AND PRACTICE OF PHARMACY (20th ed., Mack Publishing Co., 2001). Exemplary binders include, but are not limited to, polyvinylpyrrolidone (e.g. Povidone and Plasdone® K-29/32) or K30), cross-linked polyvinylpyrrolidone (Crospovidone), polyethylene glycols of various grades including PEG 3350, PEG 4000, PEG 6000, PEG 8000 and even PEG 20,000, and the like; copolymers of vinylpyrrolidone and vinyl acetate (e.g. Copovidone) such as the product sold by BASF by the tradename Kollidon® VA 64 and the like; starch such as potato starch, tapioca starch or corn starch; molasses, corn syrup, honey, maple syrup and sugars of various types; hydroxypropyl cellulose (HPC), hydroxypropyl methylcellulose (HPMC), and alginate. In exemplary embodiments, binders may optionally be included in the compositions, for example, in concentrations of about 1% to about 30% (wt/wt) or 0.1% to about 10% (wt/wt), preferably 0.1% to about 5% (wt/wt), more preferably 0.2% to about 3% (wt/wt). In a preferred embodiment one of the above-mentioned polyvinylpyrrolidone binders (e.g. PVP K30) is present.

The present compositions may comprise an antioxidant. "Antioxidants" are components which serve as preservatives to increase the stability of active ingredients which are not stable if exposed to oxygen. Suitable antioxidants can be found in REMINGTON: THE SCIENCE AND PRACTICE OF PHARMACY ($20^{th}$ ed., Mack Publishing Co., 2001). Suitable antioxidants include, but are not limited to, Tenox® 2; Tenox® PG; Tenox® s-1; BHA (2-t-butyl-4-methoxyphenol); BHT (2,6-di-t-butyl-4-methylphenol); sodium metabisulfite reducing agents; antioxidant synergists such as tocopherols (alpha, beta, or delta-tocopherol, tocopherol esters, alpha-tocopherol acetate), alkyl gallates, butylated hydroxyanisole, butylated hydroxytoluene, citric acid anhydrous and hydrous, edetic acid and its salts, lecithin, tartaric acid, ascorbic acid, ascorbyl palmitate, fumaric acid, malic acid, sodium ascorbate, sodium metabi sulfate, n-propyl gallate, monothioglycerol, resveratrol, quercetin, benzoic acid, dimethyl thiourea (DMTU), hesperetin, tetrahydrocurcumin, tetrahydrodemethoxycurcumin, and Trolox (N-acetylcysteine, 6-hydroxy-2,5,7,8-tetramethylchroman-2-carboxylic acid). In a preferred embodiment, the antioxidant is BHA. In exemplary embodiments, antioxidants may optionally be included in the compositions, for example, in concentrations of about 0.01 to about 2.0% (wt/wt), preferably 0.01 to about 0.1% (wt/wt), based upon total weight of the dosage form. In a further embodiment, the composition comprises 0.01 to 0.2% (wt/wt) BHA. In a further embodiment, the composition comprises 0.01 to 0.2% (wt/wt) BHT, preferably 0.01 to 0.1% (wt/wt) BHT. The present compositions may comprise a lubricant. Exemplary lubricants include, but are not limited to, polyethylene glycols of various molecular weight ranges including PEG 3350 (Dow Chemical) and PEG 4000, corn oil, mineral oil, hydrogenated vegetable oils (STEROTEX or LUBRITAB), peanut oil and/or castor oil. In certain embodiments, the lubricant is a neutral oil comprising a medium chain triglyceride (MCT) or propylene glycol fatty acid esters including caprylic/capric triglycerides. Non-limiting examples of neutral oils are known by the trademark MIGLYOL® including MIGLYOL® 810, MIGLYOL® 812, MIGLYOL® 818, MIGLYOL® 829 and MIGLYOL® 840. Further lubricants include vegetable oils termed long-chain triglycerides (LCT), magnesium stearate (MgSt), stearic acid, and sodium stearyl fumarate. In exemplary embodiments, lubricants may optionally be included in the compositions, for example, in concentrations of about 1% to about 50%

(wt/wt), or 0.1% to about 10% (wt/wt), preferably 1% to about 5% (wt/wt), based on total weight of the dosage form.

The present compositions may comprise a glidant. Exemplary flow aids or glidants include, but are not limited to, silicon dioxide (e.g. CARBOSIL or Aerosil) or silica gel (SYLOID), talc, starch, calcium, stearate, magnesium stearate, and aluminum magnesium silicate (NEUSILIN).

In exemplary embodiments, glidants may optionally be included in the compositions, for example, in concentrations of about 0.01 to about 25%, based upon weight of total composition. The present compositions may comprise one or more palatability enhancers.

The present compositions may comprise a sweetener to further improve the palatability. Any natural sugar may be used including confectioners' sugar, maltitol, xylitol, sorbitol, mannitol, lactose, dextrose, saccharose, glucose or fructose, or any mixture thereof. Artificial sweeteners may also be used including saccharins, aspartame, acesulfame-k and Rebaten®.

The present compositions may comprise a coloring agent. The coloring agent may be selected from azo dyes, organic or inorganic pigments or coloring agents of natural origin. The composition may comprise 0.05 to 0.25% (w/w) of a coloring agent, based on total weight of the dosage form.

The present compositions may comprise a disintegrant. Exemplary disintegrants include, but are not limited to, cellulose, carboxymethyl cellulose calcium, carboxymethyl cellulose sodium, polacrilin potassium, starch, hydroxypropyl starch, corn starch, bentonite, veegum, pregelatinized starch, modified starch, lactose monohydrate, croscarmellose sodium, microcrystalline cellulose, hydroxypropyl cellulose, glycine, crospovidone, magnesium aluminum silicate, sodium starch glycolate, guar gum, colloidal silicon dioxide, polyvinylpyrrolidone (Povidone), alginic acid, sodium alginate, calcium alginate, methylcellulose, and chitosan. In exemplary embodiments, disintegrants may optionally be included in the compositions, for example, in concentrations of 0.1% (wt/wt) to about 10% (wt/wt), based on total weight of the dosage form.

3. PROCESSES TO MAKE COMPOSITIONS

In another aspect, processes are provided for making the disclosed compositions. In one exemplary embodiment, as shown in FIG. 1, the compositions can be prepared by providing a first granulate comprising pyrazinoisoquinoline and avermectin actives; optionally coating the first granulate with a physiologically acceptable polymer matrix (e.g., a polymethacrylate-based copolymer); providing a second granulate comprising an isoxazoline class parasiticide; combining the first and second granulates and at least one pharmaceutically acceptable excipient to provide a final blend; and compressing the ready-to-press mixture into a tablet.

According to a further exemplary embodiment, compositions according to the present invention can be prepared by providing a coated first granulate comprising pyrazinoisoquinoline (e.g. praziquantel) and avermectin actives (e.g. moxidectin) as described above, providing a second granulate comprising an isoxazoline class parasiticide (e.g. lotilaner) and pyrantel or a salt thereof (e.g. pyrantel pamoate), combining the first and second granulates and at least one pharmaceutically acceptable excipient to provide a final blend; and compressing the ready-to-press mixture into a tablet.

4. PROPERTIES

The disclosed compositions can be characterized by one or more properties. For example, the compositions can be characterized by disintegration, friability, hardness, and palatability. "Ph. Eur." means the European Pharmacopeia. If the version is not specified this abbreviation refers to the European Pharmacopoeia 10.0.

Disintegration

Disintegration of the disclosed compositions can be assessed according to disintegration method 2.9.1 (Test A for smaller tablets and B for larger tablets) of the European Pharmacopoeia 6.0. Alternatively, disintegration can be assessed according to USP <701> DISINTEGRATION. Preferred compositions of the present disclosure disintegrate in less than 15 minutes in water at 37° C., as determined by the disintegration method 2.9.1 (Test A and B) of the European Pharmacopoeia 8.0. More preferred compositions of the present disclosure disintegrate in less than 10 minutes in water at 37° C., as determined by the disintegration method 2.9.1 (Test A and B) of the European Pharmacopoeia 8.0. Yet more preferred compositions of the present disclosure disintegrate in less than 5 minutes in water at 37° C., as determined by the disintegration method 2.9.1 (Test A and B) of the European Pharmacopoeia. Yet even more preferred compositions of the present disclosure disintegrate in less than 2 minutes in water at 37° C., as determined by the disintegration method 2.9.1 (Test A and B) of the European Pharmacopoeia.

The compositions may have a disintegration time of less than or equal to 15 minutes, less than or equal to 10 minutes, less than or equal to 5 minutes, less than or equal to 4 minutes, less than or equal to 3 minutes, less than or equal to 2 minutes, or less than or equal to 1 minute measured in water at 37° C., as determined by the disintegration method 2.9.1 (Test A and B) of the European Pharmacopoeia 6.0.

Friability.

Friability of the disclosed compositions can be assessed according to European Phamacopoeia 10.0, Ph. Eur. 2.9.7 or preferably USP <1216> TABLET FRIABILITY (.

The compositions can have a friability of 1% or less, 0.5% or less, 0.1% or less, or 0.05% or less, as measured according to USP <1216>. The compositions can have a friability of 1.0%, 0.5%, 0.1%, 0.09%, 0.08%, 0.07%, 0.06%, 0.05%, 0.04%, 0.03%, 0.02%, or 0.01%, as measured according to USP <1216>.

Hardness

Hardness of the disclosed compositions can be assessed according to Ph. Eur. 2.9.8. Resistance to crushing or preferably USP <1217> TABLET BREAKING FORCE.

The compositions can have a hardness of 6-9 kiloPascal (kP), 6-8 kP, or 6-7 kP, as measured according to USP <1217>. The compositions can have a hardness of 6 kP, 7 kP, 8 kP, or 9 kP, as measured according to USP <1217>. According to a further embodiment the present compositions can have a hardness of 1-50 kiloPascal (kP), 1-40 kP, or 1-35 kP, as measured according to USP <1217>.

Palatability

Palatability of the disclosed compositions can be assessed according to the Guideline on the demonstration of palatability of veterinary medicinal products, effective February 2015 [EMA/CVMP/EWP/206024/2011 (2014)], Committee for Medicinal Products for Veterinary Use (CVMP).

The compositions can have a palatability of greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 50%, or greater than or equal to 55% as measured according to the Guideline on the demonstration of palatability of veterinary medicinal products, effective February 2015 [EMA/CVMP/EWP/206024/2011 (2014)], Committee for Medicinal Products for Veterinary Use (CVMP). The compositions can have a palatability of about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100%, as measured according to the Guideline on the demonstration of palatability of veterinary medicinal products, effective February 2015 [EMA/CVMP/EWP/206024/2011 (2014)], Committee for Medicinal Products for Veterinary Use (CVMP).

5. METHODS OF USE

The compositions of the present disclosure can be used to treat and/or control ectoparasite infections or infestations in an animal. The compositions can be used as an ectoparasiticide, in particular, as an acaricide and insecticide. They may, in particular, be used in the fields of veterinary medicine, livestock husbandry and the maintenance of public health: against acarids, insects, and copepods which are parasitic upon vertebrates, particularly warm-blooded vertebrates, including companion animals, livestock, and fowl and cold-blooded vertebrates like fish. Non-limiting examples of ectoparasites include: ticks (e.g., *Ixodes* spp., (e.g., *I. ricinus*, *I. hexagonus*), *Rhipicephalus* spp. (e.g., *R. sanguineus*), *Boophilus* spp., *Amblyomma* spp. (e.g., *A. americanum*, *A. maculatum*, *A. triste*, *A. parvum*, *A. cajennense*, *A. ovale*, *A. oblongoguttatum*, *A. aureolatum*, *A. cajennense*), *Hyalomma* spp., *Haemaphysalis* spp., *Dermacentor* spp. (e.g., *D. variabilis*, *D. andersoni*, *D. marginatus*), *Ornithodorus* spp., and the like); mites (e.g., *Dermanyssus* spp., *Sarcoptes* spp. (e.g., *S. scabiei*), *Psoroptes* spp. (e.g., *P. bovis*), *Otodectes* spp., *Chorioptes* spp., *Demodex* spp., (e.g., *D. folliculorum*, *D. canis*, and *D. brevis*) and the like); chewing and sucking lice (e.g., *Damalinia* spp., *Linognathus* spp., *Cheyletiella* spp., *Haematopinus* spp., *Solenoptes* spp., *Trichodectes* spp., *Felicola* spp., and the like); fleas (e.g., *Siphonaptera* spp., *Ctenocephalides* spp., and the like); biting flies, midges, and mosquitos (e.g., *Tabanidae* spp., *Haematobia* spp., *Musca* spp., *Stomoxys* spp., *Dematobia* spp., *Cochliomyi a* spp., *Simuliidae* spp., *Ceratopogonidae* spp., *Psychodidae* spp., *Aedes* spp., *Culex* spp., *Anophles* spp., *Lucilia* spp., *Phlebotomus* spp., *Lutzomyia* spp., and the like); bed bugs (e.g., insects within the genus *Cimex* and family Cimicidae); and grubs (e.g., *Hypoderma bovis*, *H. lineatum*); and copepods (e.g., sea lice within the Order Siphonostomatoida, including genera *Lepeophtheirus* and *Caligus*).

The compositions of the present disclosure can be used to treat and/or control endoparasites, for example, helminths (e.g., trematodes, cestodes, and nematodes) including heartworm, roundworm, hookworm, whipworm, fluke, and tapeworm. The gastrointestinal roundworms include, for example, *Ostertagia ostertagi* (including inhibited larvae), *O. lyrata*, *Haemonchus placei*, *H. similis*, *H. contortus*, *Toxocara canis*, *T. leonina*, *T. cati*, *Trichostrongylus axei*, *T. colubriformis*, *T. longispicularis*, *Cooperia oncophora*, *C. pectinata*, *C. punctata*, *C. surnabada* (syn. mcmasteri), *C. spatula*, *Ascaris suum*, *Hyostrongylus rubidus*, *Bunostomum phlebotomum*, *Capillaria bovis*, *B. trigonocephalum*, *Strongyloides papillosus*, *S. ransomi*, *Oesophagostomum radiatum*, *O. dentatum*, *O. columbianum*, *O. quadrispinulatum*, *Trichuris* spp., and the like. Other parasites include: hookworms (e.g., *Ancylostoma caninum*, *A. tubaeforme*, *A. braziliense*, *Uncinaria stenocephala*); lungworms (e.g., *Dictyocaulus viviparus* and *Metastrongylus* spp); eyeworms (e.g., *Thelazia* spp.); parasitic stage grubs (e.g., *Hypoderma bovis*, *H. lineatum*, *Dermatobia hominis*; kidneyworms (e.g., *Stephanurus dentatus*); screw worm (e.g., *Cochliomyia hominivorax* (larvae); filarial nematodes of the superfamily Filarioidea and the Onchocercidae Family. Non-limiting examples of filarial nematodes within the Onchocercidae Family include the genus *Brugia* spp. (i.e., *B. malayi*, *B. pahangi*, *B. timori*, and the like), *Wuchereria* spp. (i.e., *W. bancrofti*, and the like), *Dirofdaria* spp. (*D. immitis*, *D. repens*, *D. ursi*, *D. tenuis*, *D. spectans*, *D. lutrae*, and the like), *Dipetalonema* spp. (i.e., *D. reconditum*, *D. repens*, and the like), *Onchocerca* spp. (i.e., *O. gibsoni*, *O. gutturosa*, *O. volvulus*, and the like), *Elaeophora* spp. (*E. bohmi*, *E. elaphi*, *E. poeli*, *E. sagitta*, *E. schneideri*, and the like), *Mansonella* spp. (i.e., *M. ozzardi*, *M. perstans*, and the like), and *Loa* spp. (i.e., *L. loa*).

The compositions of the present disclosure are useful for the treatment and/or control, in particular helminths, in which the endoparasitic nematodes and trematodes may be the cause of serious diseases of mammals and poultry. Typical nematodes of this indication are: *Filariidae*, *Setariidae*, *Haemonchus*, *Trichostrongylus*, *Ostertagia*, *Nematodirus*, *Cooperia*, *Ascaris*, *Bunostomum*, *Oesophagostonum*, *Charbertia*, *Trichuris*, *Strongylus*, *Trichonema*, *Dictyocaulus*, *Capillaria*, *Heterakis*, *Toxocara*, *Ascaridia*, *Oxyuris ncylostoma*, *Uncinaria*, *Toxascoris* and *Parascaris*. The trematodes include, in particular, the family of Fasciolideae, especially *Fasciola hepatica*.

Certain parasites of the species *Nematodirus*, *Cooperia* and *Oesophagostonum* infest the intestinal tract of the host animal, while others of the species *Haemonchus* and *Ostertagia* are parasitic in the stomach and those of the species *Dictyocaulus* are parasitic in the lung tissue. Parasites of the families and may be found in the internal cell tissue and in the organs, e.g. the heart, the blood vessels, the lymph vessels and the subcutaneous tissue. A particularly notable parasite is the heartworm of the dog, *Dirofdaria iminitis*.

The parasites which may be treated and/or controlled by the compositions of the present disclosure include those from the class of Cestoda (tapeworms), e.g. the families Mesocestoidae, especially of the genus *Mesocestoides*, in particular *M. lineatus*; Dipylidiidae, especially *Dipylidium caninum*, *Joyeuxiella* spp., in particular *Joyeuxiella pasquali*, and *Diplopylidium* spp., and *Taeniidae*, especially *Taenia pisformis*, *Taenia cervi*, *Taenia ovis*, *Taeneia hydaligena*, *Taenia multiceps*, *Taenia laeniaeformis*, *Taenia serialis*, and *Echinococcus* spp., most particularly *Taneia hydaligena*, *Taenia ovis*, *Taenia multiceps*, *Taenia serialis;* *Echinococcus granulosus* and *Echinococcus multilocularis*.

Furthermore, the compositions of the present disclosure are suitable for the treatment and/or control of human pathogenic parasites. Of these, typical representatives that appear in the digestive tract are those of the genus *Ancylostoma*, *Necator*, *Ascaris*, *Strongyloides*, *Trichinella*, *Capillaria*, *Trichuris* and *Enterobius*. The compositions of the present disclosure are also suitable against parasites of the genus *Wuchereria*, *Brugia*, *Onchocerca* and *Loa* from the family of *Dracunculus* and parasites of the genus *Strongyloides* and *Trichinella*, which infect the gastrointestinal tract in particular.

A particular parasite to be treated and/or controlled by the compositions of the disclosure is the heartworm (*Dirofilaria immitis*). Particular subjects for such treatment are dogs and cats.

In certain embodiments, the composition of the present disclosure is suitable for the treatment and/or control of against tick infestations (*Ixodes hexagonus, Ixodes ricinus* and *Rhipicephalus sanguineus, Dermacentor reticulatus*), for the treatment and/or control of flea infestations (*Ctenocephalides felis* and *Ctenocephalides canis*), In certain embodiments, the composition of the present disclosure is suitable for the treatment and/or control of adult fleas and prevention of new flea infestations (*Ctenocephalides felis*): the treatment and/or control of tick infestations [*Dermacentor variabilis* (American dog tick), *Ixodes scapularis* (black-legged tick), *Rhipicephalus sanguineus* (brown dog tick), *Amblyomma americanum* (lone star tick), *Dermacentor reticulatus, Ixodes ricinus* and *Ixodes hexagonus*]; the treatment and/or control nematodes: heartworm disease (*Dirofilaria immitis*), angiostrongylosis by reducing the level of infection with immature adult (L5) *Angiostrongylus vasorum*, adult hookworm (*Ancylostoma caninum*), adult roundworm (*Toxocara canis Toxascaris leonina*) and adult whipworm (*Trichuris vulpis*) infections, and cestodes (*Dipylidium caninum, Taenia pisiformis. Echinococcus multilocularis*, and *Echinococcus granulosus*) infections in dogs 8 weeks of age and older and 4.4 pounds (2 kg) of body weight or greater.

The compositions of the disclosure may be combined with one or more other active compounds or therapies for the treatment of one or more disorders, diseases or conditions, including the treatment of parasites. The compositions of the present disclosure may be administered simultaneously, sequentially or separately in combination with one or more compounds or therapies for treating parasites or other disorders.

For reasons of completeness, various aspects of the disclosure are set out in the following numbered clauses.

1. A palatable veterinary dosage form comprising
    an isoxazoline class parasiticide (e.g., lotilaner, sarolaner, afoxolaner, fluralaner);
    moxidectin; and
    praziquantel,
    wherein the praziquantel, and optionally moxidectin, are confined to discrete areas within the dosage form.
2. The palatable veterinary dosage form of clause 1, further comprising pyrantel or a salt thereof.
3. The palatable veterinary dosage form of clause 1 or clause 2, wherein the moxidectin and praziquantel are comprised within physiologically acceptable polymer matrix-coated granules (e.g., polymethacrylate-based copolymer-coated granules).
4. The palatable veterinary dosage form of any one of clauses 1-3, wherein the palatable veterinary dosage form is a hard chewable tablet.
5. The palatable veterinary dosage form of any one of clauses 1-4, wherein the palatable veterinary dosage form has a hardness of 6-9 kiloPascal (kP), 6-8 kP, or 6-7 kP, as measured according to USP <1217>.
6. The palatable veterinary dosage form of any one of clauses 1-5, wherein the palatable veterinary dosage form disintegrates in less than or equal to 15 minutes, less than or equal to 10 minutes, less than or equal to 5 minutes, less than or equal to 4 minutes, less than or equal to 3 minutes, or less than or equal to 2 minutes in water at 37° C., as determined by the disintegration method 2.9.1 (Test B) of the European Pharmacopoeia 8.0.
7. The palatable veterinary dosage form of any one of clauses 1-6, wherein the palatable veterinary dosage form has a friability of 1% or less, 0.5% or less, 0.1% or less, or 0.05% or less, as measured according to USP <1216>.
8. The palatable veterinary dosage form of any one of clauses 1-7, wherein the palatable veterinary dosage form has a palatability greater than or equal to 60%, greater than or equal to 65%, greater than or equal to 70%, greater than or equal to 75%, greater than or equal to 80%, greater than or equal to 85%, greater than or equal to 90%, or greater than or equal to 95%, as measured according to the Guideline on the demonstration of palatability of veterinary medicinal products, effective February 2015 [EMA/CVMP/EWP/206024/2011 (2014)], Committee for Medicinal Products for Veterinary Use (CVMP).
9. The palatable veterinary dosage form of any one of clauses 1-8, comprising 30-40% (wt/wt) lotilaner, 0.025% to 0.045% (wt/wt) moxidectin, and 8-10% (wt/wt) praziquantel, based on total weight of the dosage form.
10. The palatable veterinary dosage form of any one of clauses 1-8, further comprising at least one of a diluent (e.g. microcrystalline cellulose); an antioxidant (e.g., butylated hydroxytoluene); a disintegrant (e.g., croscarmellose sodium); a wetting agent (e.g., sodium lauryl sulfate); a binder (e.g., povidone K30); a taste-masking polymer (e.g., Eudragit RL 30D); a plasticizer (e.g., Plasacryl HTP20); a flavoring agent (e.g., Dtech 8P0910748 Veggie, Symtripal Liver Type Dry Flavour); a glidant (e.g., colloidal silicon dioxide); or a lubricant (e.g., magnesium stearate).
11. The palatable veterinary dosage form of clause 10, comprising microcrystalline cellulose; lactose monohydrate; butylated hydroxytoluene; croscarmellose sodium; sodium lauryl sulfate; povidone K30; Eudragit RL 30D; Plasacryl HTP20; a flavorant (e.g., Dtech 8P0910748 Veggie, or Symtripal Liver Type Dry Flavour); colloidal silicon dioxide; and magnesium stearate.
12. The palatable veterinary dosage form of clause 11, comprising 25% to 30% (wt/wt) microcrystalline cellulose; 5% to 6% (wt/wt) lactose monohydrate; 0.05% to 0.06% (wt/wt) butylated hydroxytoluene; 3% to 5% (wt/wt) croscarmellose sodium; 0.4% to 0.5% (wt/wt) sodium lauryl sulfate; 1% to 3% (wt/wt) povidone K30; 1% to 2% (wt/wt) Eudragit RL 30D; 0.1% to 0.5% (wt/wt) Plasacryl HTP20; 5% to 20% of a flavorant (e.g., Dtech 8P0910748 Veggie, or Symtripal Liver Type Dry Flavour); 0.5% to 1.5% (wt/wt) colloidal silicon dioxide; and 0.5% to 1.5% (wt/wt) magnesium stearate.
13. The palatable veterinary dosage form of any one of clauses 1-12, produced by a process comprising providing a first granulate comprising praziquantel and optionally moxidectin; optionally coating the first granulate with a physiologically acceptable polymer matrix (e.g., a polymethacrylate-based copolymer matrix) to provide a coated first granulate; providing a second granulate comprising the isoxazoline class parasiticide; combining the first granulate or coated first granulate with the second granulate and at least one pharmaceutically acceptable excipient to provide a third granulate; and compressing the third granulate into a tablet.

14. The palatable veterinary dosage form of clause 13, wherein the first granulate or coated first granulate comprises praziquantel, moxidectin, a diluent, an antioxidant, a disintegrant, a wetting agent, and a binder; the physiologically acceptable polymer matrix comprises a polymethacrylate-based copolymer; the second granulate comprises lotilaner, a diluent, a wetting agent, a disintegrant, and a binder; and the at least one pharmaceutically acceptable excipient comprises a diluent, a flavoring agent, a disintegrant, a glidant, and a lubricant.

15. The palatable veterinary dosage form of clause 14, wherein the first granulate or coated first granulate comprises praziquantel, moxidectin, lactose monohydrate, microcrystalline cellulose, butylated hydroxytoluene, croscarmellose sodium, sodium lauryl sulfate, and povidone K30; the physiologically acceptable polymer matrix comprises Eudragit RL 30D and Plasacryl HTP20; the second granulate comprises lotilaner, microcrystalline cellulose, sodium lauryl sulfate, croscarmellose sodium, and povidone K30; and the at least one pharmaceutically acceptable excipient comprises microcrystalline cellulose, a flavoring agent, croscarmellose sodium, colloidal silicone dioxide, and magnesium stearate.

16. The palatable veterinary dosage form of any one of clauses 13-15, wherein the granulates are substantially maintained in granular form during the compression.

17. A method of treating a parasitic infection, comprising administering to a non-human mammal in need thereof a palatable veterinary dosage form providing a dosage of about 20 mg/kg lotilaner, about 0.01 to about 0.05 mg/kg moxidectin, and about 5 mg/kg praziquantel, wherein the praziquantel, and optionally moxidectin, are confined to discrete areas within the dosage form.

18. The method of clause 17, wherein the palatable veterinary dosage form further provides about 5 mg/kg pyrantel or a salt thereof.

19. The method of clause 17 or clause 18, wherein the palatable veterinary dosage form provides 0.01 to 0.02 mg/kg moxidectin.

20. The method of any one of clauses 17-19, wherein the palatable veterinary dosage form is a hard chewable tablet.

21. A process for making a palatable veterinary tablet, comprising:
providing a first granulate comprising praziquantel and optionally moxidectin;
optionally coating the first granulate with a physiologically acceptable polymer matrix (e.g., a polymethacrylate-based copolymer matrix) to provide a coated first granulate;
providing a second granulate comprising an isoxazoline class parasiticide;
combining the first granulate or coated first granulate with the second granulate and at least one pharmaceutically acceptable excipient to provide a third granulate; and
compressing the third granulate into a tablet.

22. The process of clause 21, wherein the granulates are substantially maintained in granular form during the compression.

23. The process of clause 21 or 22, wherein the at least one pharmaceutically acceptable excipient comprises at least 15%, preferably about 15-30%, microcrystalline cellulose.

24. The process of any one of clauses 21-23, wherein the second granulate further comprises pyrantel or a salt thereof.

25. The process of any one of clauses 21-24, wherein coating the first granulate with a physiologically acceptable polymer matrix (e.g., a polymethacrylate-based copolymer matrix) is conducted with a fluidized bed reactor configured for top-spray coating.

26. The process of any one of clauses 21-24, wherein coating the first granulate with a physiologically acceptable polymer matrix (e.g., a polymethacrylate-based copolymer matrix) is conducted with a fluidized bed reactor configured for bottom-spray coating.

27. The process of any one of clauses 21-24, wherein coating the first granulate with a physiologically acceptable polymer matrix (e.g., a polymethacrylate-based copolymer matrix) is conducted with a fluidized bed reactor configured for tangential-spray coating.

28. A palatable veterinary dosage form comprising
an isoxazoline class parasiticide (e.g., lotilaner, sarolaner, afoxolaner, fluralaner);
a macrocyclic lactone class parasiticide (e.g. milbemycin oxime, moxidectin, doramectin selametin); and
a pyrazinoisoquinoline class parasiticide (e.g. praziquantel),
wherein pyrazinoisoquinoline class parasiticide, preferably praziquantel, and optionally the macrocyclic lactone class parasiticide, preferably moxidectin, are confined to discrete areas within the dosage form.

29. The palatable veterinary dosage form of clause 28, further comprising a tretrahydropyrimidine class parasiticide, preferably pyrantel or a salt thereof.

30. The palatable veterinary dosage form of clause 28 or clause 29, wherein the moxidectin and praziquantel are comprised within physiologically acceptable polymer matrix-coated granules (e.g., polymethacrylate-based copolymer-coated granules).

31. The palatable veterinary dosage form of any one of clauses 28-30, wherein the palatable veterinary dosage form is a hard chewable tablet.

32. The palatable veterinary dosage form of any one of clauses 28-31, wherein the palatable veterinary dosage form disintegrates in less than or equal to 15 minutes in water at 37° C., as determined by the disintegration method 2.9.1 (Test A and B) of the European Pharmacopoeia 8.0.

33. The palatable veterinary dosage form of any one of clauses 28-32, wherein the palatable veterinary dosage form has a friability of 1% or less as measured according to USP <1216>.

34. The palatable veterinary dosage form of any one of clauses 28-33, comprising 20-40% (wt/wt) lotilaner, 0.020% to 0.045% (wt/wt) moxidectin, and 5-10% (wt/wt) praziquantel, based on total weight of the dosage form.

35. The palatable veterinary dosage form of any one of clauses 28-34, further comprising at least one of a diluent (e.g. microcrystalline cellulose); an antioxidant (e.g., butylated hydroxytoluene); a disintegrant (e.g., croscarmellose sodium); a wetting agent (e.g., sodium lauryl sulfate); a binder (e.g., povidone K30); a taste-masking polymer (e.g., Eudragit RL 30D); a plasticizer (e.g., Plasacryl HTP20); a flavoring agent (e.g., Dtech 8P0910748 Veggie, Symtripal Liver Type Dry Flavour); a glidant (e.g., colloidal silicon dioxide); or a lubricant (e.g., magnesium stearate).

36. The palatable veterinary dosage form of clause 35, comprising microcrystalline cellulose; lactose monohydrate; butylated hydroxytoluene; croscarmellose sodium; sodium lauryl sulfate; povidone K30; Eudragit RL 30D; Plasacryl HTP20; a flavorant (e.g., Dtech 8P0910748 Veggie, and/or Symtripal Liver Type Dry Flavour); colloidal silicon dioxide; and magnesium stearate.

37. The palatable veterinary dosage form of clause 36, comprising 25% to 30% (wt/wt) microcrystalline cellulose; 3% to 6% (wt/wt) lactose monohydrate; 0.05% to 0.06% (wt/wt) butylated hydroxytoluene; 3% to 5% (wt/wt) croscarmellose sodium; 0.4% to 0.6% (wt/wt) sodium lauryl sulfate; 1% to 3% (wt/wt) povidone K30; 1% to 2% (wt/wt) Eudragit RL; 0.1% to 0.5% (wt/wt) Plasacryl HTP20; 5% to 20% of a flavorant (e.g., Dtech 8P0910748 Veggie, and/or Symtripal Liver Type Dry Flavour); 0.5% to 1.5% (wt/wt) colloidal silicon dioxide; and 0.5% to 1.5% (wt/wt) magnesium stearate.

38. The palatable veterinary dosage form of any one of clauses 28-37, produced by a process comprising providing a first granulate comprising praziquantel and optionally moxidectin; optionally coating the first granulate with a physiologically acceptable polymer matrix (e.g., a polymethacrylate-based copolymer matrix) to provide a coated first granulate; providing a second granulate comprising the isoxazoline class parasiticide; combining the first granulate or coated first granulate with the second granulate and at least one pharmaceutically acceptable excipient to provide a final blend; and compressing the ready-to-press mixture into a tablet.

39. The palatable veterinary dosage form of clause 38, wherein the first granulate or coated first granulate comprises praziquantel, moxidectin, a diluent, an antioxidant, a disintegrant, a wetting agent, and a binder; the physiologically acceptable polymer matrix comprises a polymethacrylate-based copolymer; the second granulate comprises lotilaner, a diluent, a wetting agent, a disintegrant, and a binder; and the at least one pharmaceutically acceptable excipient comprises a diluent, a flavoring agent, a disintegrant, a glidant, and a lubricant.

40. The palatable veterinary dosage form of clause 39, wherein the first granulate or coated first granulate comprises praziquantel, moxidectin, lactose monohydrate, microcrystalline cellulose, butylated hydroxytoluene, croscarmellose sodium, sodium lauryl sulfate, and povidone K30; the physiologically acceptable polymer matrix comprises Eudragit RL 30D and Plasacryl HTP20; the second granulate comprises lotilaner, microcrystalline cellulose, sodium lauryl sulfate, croscarmellose sodium, and povidone K30; and the at least one pharmaceutically acceptable excipient comprises microcrystalline cellulose, a flavoring agent, croscarmellose sodium, colloidal silicone dioxide, and magnesium stearate.

41. The palatable veterinary dosage form of clauses 38 to 40, wherein the second granulate additionally comprises a tetrahydropyrimidine class parasiticide, preferably pyrantel or a salt thereof, more preferably pyrantel pamoate.

42. The palatable veterinary dosage form of any one of clauses 38-41, wherein the granulates are substantially maintained in granular form during the compression.

43. A method of treating a parasitic infection, comprising administering to a non-human mammal in need thereof a palatable veterinary dosage form providing a dosage of about 20 mg/kg lotilaner, about 0.01 to about 0.05 mg/kg moxidectin, and about 5 mg/kg praziquantel, wherein the praziquantel, and optionally moxidectin, are confined to discrete areas within the dosage form.

44. The palatable veterinary dosage form of any one of clauses 28-42 for use in the control of parasites in and/or on animals.

45. The method of clause 43, wherein the palatable veterinary dosage form further provides about 5 mg/kg pyrantel or a salt thereof.

46. The method of clause 43 or clause 45, wherein the palatable veterinary dosage form provides 0.01 to 0.02 mg/kg moxidectin.

47. A process for making a palatable veterinary tablet, comprising:

providing a first granulate comprising praziquantel and optionally moxidectin;

optionally coating the first granulate with a physiologically acceptable polymer matrix (e.g., a polymethacrylate-based copolymer matrix) to provide a coated first granulate;

providing a second granulate comprising an isoxazoline class parasiticide;

combining the first granulate or coated first granulate with the second granulate and at least one pharmaceutically acceptable excipient to provide a final blend; and compressing the ready-to-press mixture into a tablet.

48. The process of clause 47, wherein the granulates are substantially maintained in granular form during the compression.

49. The process of clause 47 or 48, wherein the at least one pharmaceutically acceptable excipient comprises at least 15%, preferably about 15-30%, microcrystalline cellulose.

50. The process of clauses 47-49, wherein the second granulate further comprises pyrantel or a salt thereof.

51. The process of any one of clauses 47-50, wherein coating the first granulate with a physiologically acceptable polymer matrix (e.g., a polymethacrylate-based copolymer matrix) is conducted with a fluidized bed reactor configured for top-spray coating.

52. The process of any one of clauses 47-50, wherein coating the first granulate with a physiologically acceptable polymer matrix (e.g., a polymethacrylate-based copolymer matrix) is conducted with a fluidized bed reactor configured for bottom-spray coating.

6. EXAMPLES

The following examples are provided to illustrate the invention and are not intended to be limiting in any way.

Example 1

Lotilaner/Moxidectin/Praziquantel Tablet

Table 1 shows a tablet composition prepared with lotilaner, moxidectin, and praziquantel as active pharmaceutical ingredients. Table 2 provides exemplary process parameters consistent with those used to produce the praziquantel/moxidectin granulation and coating of Table 1. Lotilaner was granulated along with the identified excipients in a high shear granulator, dried, and sized. Praziquantel and moxidectin were granulated in a high shear granulator, dried and sized. Sized praziquantel and moxidectin granules were coated with Eudragit RL 30D in a fluidized bed coater (top or bottom spray) to a predetermined coating level. Coated granules were sieved. Lotilaner and coated praziquantel and moxidectin granules were blended along with extra granular excipients and lubricated for compression. The lubricated blend was compressed. on a compression machine per weight of the selected drug product parameters, as shown in Table 3. The tablets were light brown colored, round biconvex tablets with brownish spots without embossing for oral use. Tablets were packaged in blister packaging.

TABLE 1

Tablet Composition

| Unit of Operation | Ingredient | Function | Tablet Composition (% w/w) |
|---|---|---|---|
| Moxidectin (1.97 mg/g)/ Praziquantel (500 mg/g) Granulation | Moxidectin | API | 0.036 |
| | Praziquantel | API | 9.120 |
| | Lactose Monohydrate (Granulac 200) | Diluent | 5.472 |
| | Microcrystalline Cellulose (Type 101) | Diluent | 2.077 |
| | Butylated Hydroxytoluene | Antioxidant | 0.055 |
| | Croscarmellose Sodium | Disintegrant | 0.912 |
| | Sodium Lauryl Sulfate | Wetting Agent | 0.021 |
| | Povidone K30 | Binder | 0.547 |
| | Purified Water | Process aid | — |
| Moxidectin (1.79 mg/g)/ Praziquantel (454.5 mg/g) Taste Masking Granules | Eudragrit RL 30D | Taste masking polymer | 1.330 |
| | Plasacryl HTP20 | Plasticizer for Eudragrit RL 30D | 0.266 |
| | Purified Water | Process aid | — |
| Lotilaner (800 mg/g) Granulation | Lotilaner | API | 36.000 |
| | Microcrystalline Cellulose (Type 101) | Diluent | 6.600 |
| | Sodium Lauryl Sulfate | Wetting Agent | 0.450 |
| | Croscarmellose Sodium | Disintegrant | 0.600 |
| | Povidone K30 | Binder | 1.350 |
| | Purified Water | Process aid | — |
| Dry Blend | Microcrystalline Cellulose (Avicel 200) | Diluent | 18.664 |
| | Dtech 8P0910748 Veggie | Flavoring agent | 5.000 |
| | Symtripal Liver Type Dry Flavour | Flavoring agent | 7.500 |
| | Croscarmellose Sodium | Disintegrant | 2.000 |
| | Colloidal Silicon Dioxide | Glidant | 1.000 |
| | Magnesium Stearate | Lubricant | 1.000 |
| | Total | | 100.00 |

TABLE 2

Process Parameters For Praziquantel/Moxidectin Granulation & Coating

| | |
|---|---|
| Granulation: | 16.3 kg batch size |
| Dry Pre-Blend (praxi + moxi) | 2 min at very low speed as pre-blending |
| Dry Blend | 2 min at medium speed as blending |
| water adding | 4 min at high speed |
| wet massing | at high speed for 0.5-1.0 min |
| wet sieving | at low speed with 3 mm sieve size (round) |
| Drying: | 16.3 kg batch size |
| pre heating | up to 300 m³/h at 75° C. |
| inlet air volume | up to 300 m³/h |
| inlet temp. | 75° C. |
| prod. temp. endpoint | 35° C. |
| dry sieving | at low speed with 1.0 mm sieve size |
| Loss on drying (LOD) target | ≤2.0% (at 100° C criteria 3 [1 mg/50 s]) |
| Coating (BOTTOM spray): | 6 kg batch size |
| pre heating I | 115 m3/h at 35° C. without material |
| pre heating II | 115 m3/h at 50° C. with material |

TABLE 2-continued

Process Parameters For Praziquantel/Moxidectin Granulation & Coating

| | |
|---|---|
| coating inlet air volume | 115 m3/h |
| inlet temp. | 50° C. |
| prod temp Coating | 30° C. or less |
| atomization pressure | 1.8 bar |
| spray rate | 20 g/min or less |
| prod. temp. Drying | 35° C. or less |
| prod. temp. cooling | 30° C. with 20° C inlet air temp. |
| LOD target | ≤2.0% (at 100° C criteria 3 [1 mg/50 s]) |
| Coating (TOP spray): | 6 kg batch size |
| pre heating I | 150 m3/h at 35° C. without material |
| pre heating II | 150 m3/h at 50° C with material |
| coating inlet air volume | 150 m3/h |
| inlet temp. | 60° C. |
| prod. temp. Coating | 30° C. or less |
| atomization pressure | 1.2 bar |
| spray rate | 40 g/min or less |
| prod. temp. Drying | 35° C. or less |
| prod. temp. cooling | 30° C. with 20° C inlet air temp. |

TABLE 3

Tablet Dosage Forms by Animal Weight Band

| Animal Weight Band | Lotilaner (mg) | Moxidectin (mg) | Praziquantel (mg) | Tablet Weight (mg) | Tablets Dimensions (mm) |
| --- | --- | --- | --- | --- | --- |
| 4.4-6.0 lbs. (2-2.7 kg) | 56.25 | 0.05625 | 14.25 | 156.25 | 7.25 |
| 6.1-12.0 lbs. (2.8-5.4 kg) | 112.50 | 0.1125 | 28.50 | 312.50 | 9.5 |
| 12.1-25 lbs. (5.5-11.25 kg) | 225.00 | 0.225 | 57.00 | 625.00 | 12 |
| 25.1-50 lbs. (11.3-22.5 kg) | 450.00 | 0.450 | 114.00 | 1250.00 | 15.2 |
| 50.1-100 lbs. (22.6-45 kg) | 900.00 | 0.900 | 228.00 | 2500.00 | 19.2 |

Example 2

Lotilaner/MoxidectinPraziquantel Tablet

Tablets having the composition shown in Table 4 were prepared as described in Example 1.

TABLE 4

Tablet Composition

| Unit of Operation | Ingredient | Function | Tablet Composition (% w/w) |
| --- | --- | --- | --- |
| Moxidectin (1.97 mg/g)/ Praziquantel (500 mg/g) Granulation | Moxidectin | API | 0.036 |
| | Praziquantel | API | 9.120 |
| | Lactose Monohydrate (Granulac 200) | Diluent | 5.472 |
| | Microcrystalline Cellulose (Type 101) | Diluent | 2.077 |
| | Butylated Hydroxytoluene | Antioxidant | 0.055 |
| | Croscarmellose Sodium | Disintegrant | 0.912 |
| | Sodium Lauryl Sulfate | Wetting Agent | 0.021 |
| | Povidone K30 | Binder | 0.547 |
| | Purified Water | Process aid | — |
| Moxidectin (1.79 mg/g)/ Praziquantel (454.5 mg/g) Taste Masking Granules | Eudragrit RL 30D | Taste masking polymer | 1.520 |
| | Plasacryl HTP20 | Plasticizer for Eudragrit RL 30D | 0.304 |
| | Purified Water | Process aid | — |
| Lotilaner (800 mg/g) Granulation | Lotilaner | API | 36.000 |
| | Microcrystalline Cellulose (Type 101) | Diluent | 6.600 |
| | Sodium Lauryl Sulfate | Wetting Agent | 0.450 |
| | Croscarmellose Sodium | Disintegrant | 0.600 |
| | Povidone K30 | Binder | 1.350 |
| | Purified Water | Process aid | — |
| Dry Blend | Microcrystalline Cellulose (Avicel 200) | Diluent | 18.436 |
| | Dtech 8P0910748 Veggie | Flavoring agent | 5.000 |
| | Symtripal Liver Type Dry Flavour | Flavoring agent | 7.500 |
| | Croscarmellose Sodium | Disintegrant | 2.000 |
| | Colloidal Silicon Dioxide | Glidant | 1.000 |
| | Magnesium Stearate | Lubricant | 1.000 |
| | Total | | 100.00 |

Example 3

Lotilaner/Moxidectin/Praziquantel/Pyrantel Tablet

The composition of a Lotilaner/Moxidectin/Praziquantel/Pyrantel Pamoate tablet is given in table 5. The Moxidectin/Praziquantel granules are manufactured similarly to the above-mentioned granulation process (see in particular Example 1). Afterwards, a coating step is performed.

For the second granules, Lotilaner and Pyrantel Pamoate were granulated in a high shear granulator, dried and sieved. Both granules and the post-blend were combined under mixing. The resulting final blend was then compressed into tablets of different sizes (e.g. with a total weight of 236 mg, 472 mg, 945 mg, 1889 mg or 3778 mg per tablet). The tablets were light brown colored, round biconvex tablets with brownish spots. Tablets were packaged in blister packaging.

TABLE 5

Composition of Lotilaner/Moxidectin/Praziquantel/Pyrantel Pamoate Tablet

| Unit of Operation | Ingredient | Tablet Composition (% w/w) |
|---|---|---|
| Moxidectin (2.46 mg/g)/ | Moxidectin | 0.024 |
| Praziquantel (500 mg/g) | Praziquantel | 6.035 |
| Granulation | Lactose Monohydrate (Granulac 200) | 3.621 |
| | Microcrystalline Cellulose (Type 101) Granulact (Basel) oder Vivapur (Huningue) | 1.374 |
| | Butylated Hydroxytoluene (BHT) | 0.036 |
| | Croscarmellose Sodium | 0.603 |
| | Sodium Lauryl Sulfate (SLS) | 0.014 |
| | Povidone K30 | 0.362 |
| | Purified Water* | — |
| | Part of uncoated Granules in Final Blend | 12.06882 |
| Moxidectin/Praziquantel | Eudragrit RL 30D | 1.006 |
| Granules Coated with 10% | Plasacryl HTP20 | 0.201 |
| RL30D | Purified Water* | — |
| | Part of coated Granules in Final Blend | 13.2758 |
| Lotilaner Pyrantel | Lotilaner | 23.822 |
| (800 mg/g) Granulation | Pyrantel Pamoate | 17.392 |
| | Microcrystalline Cellulose (Type 101) | 7.815 |
| | Sodium Lauryl Sulfate (SLS) | 0.518 |
| | Croscarmellose Sodium | 0.690 |
| | Povidone K30 | 1.554 |
| | Purified Water* | — |
| | Part of Lotilaner Pyrantel Granules in Final Blend | 51.7910 |
| Dry Blend | Microcrystalline Cellulose (Type 200) ** | 17.436 |
| | Dtech 8P0910748 Veggie | 5.000 |
| | Symtripal Liver Type Dry Flavour | 7.500 |
| | Croscarmellose Sodium | 3.000 |
| | Colloidal Silicon Dioxide | 1.000 |
| | Magnesium Stearate | 1.000 |
| | Part of Dry Blend Granules in Final Blend | 34.9360 |
| | Total | 100.00 |

*Evaporated during the drying process and therefore excluded from the calculation It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A palatable veterinary dosage form comprising an isoxazoline class parasiticide selected from the group consisting of lotilaner, sarolaner, afoxolaner, and fluralaner;
    and a first granulate comprising granules, wherein the granules of the first granulate comprise
    a macrocyclic lactone class parasiticide; and
    a pyrazinoisoquinoline class parasiticide,
    wherein the pyrazinoisoquinoline class parasiticide comprises praziquantel, and the macrocyclic lactone class parasiticide comprises moxidectin.

2. The palatable veterinary dosage form of claim 1, further comprising a tetrahydropyrimidine class parasiticide.

3. The palatable veterinary dosage form of claim 1, wherein the first granulate comprises physiologically acceptable polymer matrix-coated granules.

4. The palatable veterinary dosage form of claim 1, wherein the palatable veterinary dosage form is a hard chewable tablet.

5. The palatable veterinary dosage form of claim 1, wherein the palatable veterinary dosage form disintegrates in less than or equal to 15 minutes in water at 37° C., as determined by the disintegration method 2.9.1 (Test A and B) of the European Pharmacopoeia 8.0.

6. The palatable veterinary dosage form of claim 1, wherein the palatable veterinary dosage form has a friability of 1% or less as measured according to USP <1216>.

7. The palatable veterinary dosage form of claim 1, comprising 20-40% (wt/wt) lotilaner, 0.020% to 0.045% (wt/wt) moxidectin, and 5-10% (wt/wt) praziquantel, based on total weight of the dosage form.

8. The palatable veterinary dosage form of claim 1, further comprising at least one of a diluent; an antioxidant; a disintegrant; a wetting agent; a binder; a taste-masking polymer; a plasticizer; a flavoring agent; a glidant; or a lubricant.

9. The palatable veterinary dosage form of claim 8, comprising microcrystalline cellulose; lactose monohydrate; butylated hydroxytoluene; croscarmellose sodium; sodium lauryl sulfate; polyvinylpyrrolidone K30; ammonia methacrylate copolymer type A; a 20% aqueous emulsion comprising glycerol monostearate, triethyl citrate, and polysorbate 80; a flavorant; colloidal silicon dioxide; and magnesium stearate.

10. The palatable veterinary dosage form of claim 9, comprising 25% to 30% (wt/wt) microcrystalline cellulose; 3% to 6% (wt/wt) lactose monohydrate; 0.05% to 0.06% (wt/wt) butylated hydroxytoluene; 3% to 5% (wt/wt) croscarmellose sodium; 0.4% to 0.6% (wt/wt) sodium lauryl sulfate; 1% to 3% (wt/wt) polyvinylpyrrolidone; 1% to 2% (wt/wt) ammonia methacrylate copolymer type A; 0.1% to 0.5% (wt/wt) 20% aqueous emulsion comprising glycerol monostearate, triethyl citrate, and polysorbate 80; 5% to 20% of a flavorant; 0.5% to 1.5% (wt/wt) colloidal silicon dioxide; and 0.5% to 1.5% (wt/wt) magnesium stearate.

11. The palatable veterinary dosage form of claim 1, produced by a process comprising providing a first granulate comprising praziquantel and moxidectin; optionally coating the first granulate with a physiologically acceptable polymer matrix optionally a polymethacrylate-based copolymer matrix to provide a coated first granulate; providing a second granulate comprising the isoxazoline class parasiticide; combining the first granulate or coated first granulate with the second granulate and at least one pharmaceutically acceptable excipient to provide a final blend; and compressing a ready-to-press mixture into a tablet.

12. The palatable veterinary dosage form of claim 11, wherein the first granulate or coated first granulate comprises praziquantel, moxidectin, a diluent, an antioxidant, a disintegrant, a wetting agent, and a binder; the physiologically acceptable polymer matrix comprises a polymethacrylate-based copolymer; the second granulate comprises lotilaner, a diluent, a wetting agent, a disintegrant, and a binder; and the at least one pharmaceutically acceptable excipient comprises a diluent, a flavoring agent, a disintegrant, a glidant, and a lubricant.

13. The palatable veterinary dosage form of claim 12, wherein the first granulate or coated first granulate comprises praziquantel, moxidectin, lactose monohydrate, microcrystalline cellulose, butylated hydroxytoluene, croscarmellose sodium, sodium lauryl sulfate, and polyvinylpyrrolidone; the physiologically acceptable polymer matrix comprises ammonia methacrylate copolymer type A and a 20% aqueous emulsion comprising glycerol monostearate, triethyl citrate, and polysorbate 80; the second granulate comprises lotilaner, microcrystalline cellulose, sodium lauryl sulfate, croscarmellose sodium, and polyvinylpyrrolidone; and the at least one pharmaceutically acceptable excipient comprises microcrystalline cellulose, a flavoring agent, croscarmellose sodium, colloidal silicone dioxide, and magnesium stearate.

14. The palatable veterinary dosage form of claim 1, wherein the first granulate is formed by co-granulating the macrocyclic lactone class parasiticide and the pyrazinoisoquinoline.

15. The palatable veterinary dosage form of claim 1, comprising a second granulate, the second granulate comprising the isoxazoline class parasiticide.

16. The palatable veterinary dosage form of claim 15, wherein the second granulate further comprises the tetrahydropyramidine class parasiticide.

17. The palatable veterinary dosage form of claim 16, wherein the tetrahydropyramidine class parasiticide is pyrantel.

* * * * *